(12) United States Patent
Austrheim et al.

(10) Patent No.: US 11,485,375 B2
(45) Date of Patent: Nov. 1, 2022

(54) UNLOADING ARRANGEMENT AND UNLOADING STATION, AS WELL AS METHOD OF UNLOADING AN ITEM FROM A STORAGE CONTAINER

(71) Applicant: Autostore Technology AS, Nedre Vats (NO)

(72) Inventors: Trond Austrheim, Etne (NO); Jorgen Djuve Heggebo, Olen (NO); Uwe Gruenbeck, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 130 days.

(21) Appl. No.: 17/057,121

(22) PCT Filed: Jun. 11, 2019

(86) PCT No.: PCT/EP2019/065149
§ 371 (c)(1),
(2) Date: Nov. 20, 2020

(87) PCT Pub. No.: WO2019/238642
PCT Pub. Date: Dec. 19, 2019

(65) Prior Publication Data
US 2021/0188544 A1 Jun. 24, 2021

(30) Foreign Application Priority Data

| Jun. 12, 2018 | (NO) | 20180813 |
| Jul. 19, 2018 | (NO) | 20181005 |
| Nov. 28, 2018 | (NO) | 20181530 |

(51) Int. Cl.
*B65G 1/04* (2006.01)
*B60W 50/00* (2006.01)
(Continued)

(52) U.S. Cl.
CPC ......... *B60W 50/0098* (2013.01); *B61B 13/00* (2013.01); *B65G 1/0414* (2013.01);
(Continued)

(58) Field of Classification Search
CPC ... B65G 1/0478; B65G 1/0485; B65G 1/0464
(Continued)

(56) References Cited

U.S. PATENT DOCUMENTS

| 3,519,150 A | 7/1970 | Keena et al. |
| 3,800,963 A | 2/1974 | Holland |

(Continued)

FOREIGN PATENT DOCUMENTS

| CA | 2988122 A1 | 12/2016 |
| CN | 101553416 A | 10/2009 |

(Continued)

OTHER PUBLICATIONS

Office Action issued in Chinese Application No. 201980037162.3; dated Sep. 27, 2021 (8 pages).
(Continued)

*Primary Examiner* — Mark C Hageman
(74) *Attorney, Agent, or Firm* — Osha Bergman Watanabe & Burton LLP

(57) ABSTRACT

An unloading arrangement, an unloading station, and a method of unloading an item (5) from a storage container (6), comprising: a delivery vehicle (30); a storage container (6) carried by the delivery vehicle (30); and an unloading station (10) for unloading an item (5) from the storage container (6) while it is being carried by the delivery vehicle (30) in an automatic storage and retrieval system (1), the unloading station (10) comprising: an unloading device (40); and a destination conveyor (60) configured to convey the item (5) to a target destination (TD), wherein the unloading device (40) is configured to move the item (5) through a side
(Continued)

opening of the storage container (6) to the destination conveyor (60).

12 Claims, 15 Drawing Sheets

(51) Int. Cl.
| | |
|---|---|
| G05D 1/00 | (2006.01) |
| B65G 1/06 | (2006.01) |
| B66F 9/19 | (2006.01) |
| B65G 1/137 | (2006.01) |
| B65G 47/06 | (2006.01) |
| B65G 47/52 | (2006.01) |
| B65G 57/03 | (2006.01) |
| B65G 63/06 | (2006.01) |
| B65G 65/23 | (2006.01) |
| B66F 9/06 | (2006.01) |
| G05D 1/02 | (2020.01) |
| B61B 13/00 | (2006.01) |
| B65G 67/24 | (2006.01) |
| B65G 43/00 | (2006.01) |
| B65G 63/00 | (2006.01) |

(52) U.S. Cl.
CPC ......... *B65G 1/0457* (2013.01); *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 43/00* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 2710/06* (2013.01); *B60W 2720/10* (2013.01); *B60W 2720/24* (2013.01); *B65G 1/1378* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(58) Field of Classification Search
USPC .................................................. 414/416.04
See application file for complete search history.

(56) References Cited

U.S. PATENT DOCUMENTS

| | | | |
|---|---|---|---|
| 4,538,950 A | 9/1985 | Shiomi et al. | |
| 4,909,697 A | 3/1990 | Bernard, II et al. | |
| 5,078,566 A | 1/1992 | Ferrence | |
| 5,360,306 A | 11/1994 | Nakayama et al. | |
| 5,538,809 A | 7/1996 | Bittihn et al. | |
| 7,101,139 B1 | 9/2006 | Benedict | |
| 8,628,289 B1 | 1/2014 | Benedict et al. | |
| 9,315,320 B2 * | 4/2016 | Kawano ............... | B65G 1/0492 |
| 9,527,669 B1 | 12/2016 | Hanssen et al. | |
| 10,059,519 B2 | 8/2018 | Hofmann | |
| 10,961,054 B2 * | 3/2021 | Gravelle ............... | B65G 1/065 |
| 2003/0093176 A1 | 5/2003 | Ohtsuka et al. | |
| 2005/0047895 A1 | 3/2005 | Lert | |
| 2008/0014062 A1 | 1/2008 | Yuyama et al. | |
| 2011/0008038 A1 | 1/2011 | Yamashita | |
| 2011/0027059 A1 | 2/2011 | Benedict et al. | |
| 2012/0282068 A1 | 11/2012 | Tschurwald et al. | |
| 2014/0014470 A1 | 1/2014 | Razumov | |
| 2014/0086714 A1 | 3/2014 | Malik | |
| 2014/0277693 A1 | 9/2014 | Naylor | |
| 2014/0288696 A1 | 9/2014 | Lert | |
| 2014/0292274 A1 | 10/2014 | Dorval et al. | |
| 2014/0311858 A1 | 10/2014 | Keating et al. | |
| 2016/0060037 A1 | 3/2016 | Razumov | |
| 2016/0137435 A1 | 5/2016 | Tanaka et al. | |
| 2016/0176638 A1 | 6/2016 | Toebes | |
| 2016/0325932 A1 | 11/2016 | Hognaland | |
| 2017/0057745 A1 | 3/2017 | Ueda et al. | |
| 2017/0166400 A1 | 6/2017 | Hofmann | |
| 2018/0044110 A1 | 2/2018 | Clarke et al. | |
| 2018/0068253 A1 | 3/2018 | Simms et al. | |
| 2018/0082162 A1 | 3/2018 | Durham et al. | |
| 2018/0118078 A1 | 5/2018 | Alkhaldi et al. | |
| 2018/0141754 A1 | 5/2018 | Garrett et al. | |
| 2018/0150793 A1 | 5/2018 | Lert, Jr. et al. | |
| 2020/0148474 A1 | 5/2020 | Salichs et al. | |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 | 6/2017 |
| CN | 106829298 A | 6/2017 |
| CN | 206790852 U | 12/2017 |
| CN | 108140168 A | 6/2018 |
| DE | 40 16 810 C1 | 11/1991 |
| DE | 9310690 U1 | 9/1993 |
| DE | 102009017241 | 10/2010 |
| EP | 0458021 | 11/1991 |
| EP | 0458021 A1 | 11/1991 |
| EP | 0534558 | 3/1993 |
| EP | 2881905 A1 | 6/2015 |
| EP | 3003932 A1 | 4/2016 |
| GB | 1267751 A | 3/1972 |
| GB | 1 276 160 A | 6/1972 |
| GB | 2106070 | 4/1989 |
| GB | 2211822 | 7/1989 |
| GB | 2233319 A | 1/1991 |
| GB | 2544648 A | 5/2017 |
| JP | S64-017707 A | 1/1989 |
| JP | 64-85656 | 3/1989 |
| JP | H09152914 A | 6/1997 |
| JP | 2014 186693 | 10/2014 |
| JP | 2017088404 A | 5/2017 |
| KR | 20170026074 A | 3/2017 |
| NO | 154125 | 4/1981 |
| NO | 317366 B1 | 10/2004 |
| WO | 9614258 A1 | 5/1996 |
| WO | 2005/077789 A1 | 8/2005 |
| WO | 2012106746 A1 | 8/2012 |
| WO | 2014075937 A1 | 5/2014 |
| WO | 2014090684 | 6/2014 |
| WO | 2014/195901 A1 | 12/2014 |
| WO | 2014195901 | 12/2014 |
| WO | 2015084236 A1 | 6/2015 |
| WO | 2015/140216 A1 | 9/2015 |
| WO | 2015/193278 A1 | 12/2015 |
| WO | 2015193278 | 12/2015 |
| WO | 2016/166323 A1 | 10/2016 |
| WO | 2016/196815 A1 | 12/2016 |

(56) References Cited

FOREIGN PATENT DOCUMENTS

| WO | 2016196815 | | 12/2016 |
|---|---|---|---|
| WO | 2016198467 | A1 | 12/2016 |
| WO | 2016198565 | | 12/2016 |
| WO | 2017081273 | A1 | 5/2017 |
| WO | 2017081281 | | 5/2017 |
| WO | 2017081281 | A1 | 5/2017 |
| WO | 2017121515 | A1 | 7/2017 |
| WO | 2017/153563 | A1 | 9/2017 |
| WO | 2017211640 | | 12/2017 |
| WO | 2017220651 | | 12/2017 |
| WO | 2018/162757 | A1 | 9/2018 |

OTHER PUBLICATIONS

Extended European Search Report issued in European Application No. 21186410.3, dated Nov. 25, 2021 (5 pages).
Office Action in counterpart Chinese Patent Application No. 201980039028.7 dated Oct. 27, 2021 (15 pages).
Office Action in counterpart Chinese Patent Application No. 201980039068.1 dated Sep. 15, 2021 (23 pages).
Office Action issued in Chinese Application No. 2019800388569 dated Oct. 19, 2021 (16 pages).
Office Action issued in Chinese Application No. 201980039046.5 dated Sep. 15, 2021 (18 pages).
Office Action in counterpart Chinese Patent Application No. 201980038106.1 dated Sep. 8, 2021 (6 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
ISR dated Jun. 12, 2018, cited inter alia as statement of relevance for any non-English references cited therein.
NOSR dated May 23, 2019, cited inter alia as statement of relevance for any non-English references cited therein.
NOSR dated Feb. 6, 2019, cited inter alia as statement of relevance for any non-English references cited therein.
IPRP dated Oct. 1, 2020, cited inter alia as statement of relevance for any non-English references cited therein.
WOIPEA dated Apr. 28, 2020, cited inter alia as statement of relevance for any non-English references cited therein.
Office Action issued in Chinese Application No. 201980039066.2 dated Sep. 10, 2021 (6 pages).
Search Report issued in Chinese Application No. 201980039066.2 dated Sep. 6, 2021 (2 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
United States Office Action in related U.S. Appl. No. 16/972,482, dated Mar. 22, 2022 (46 pages).

* cited by examiner

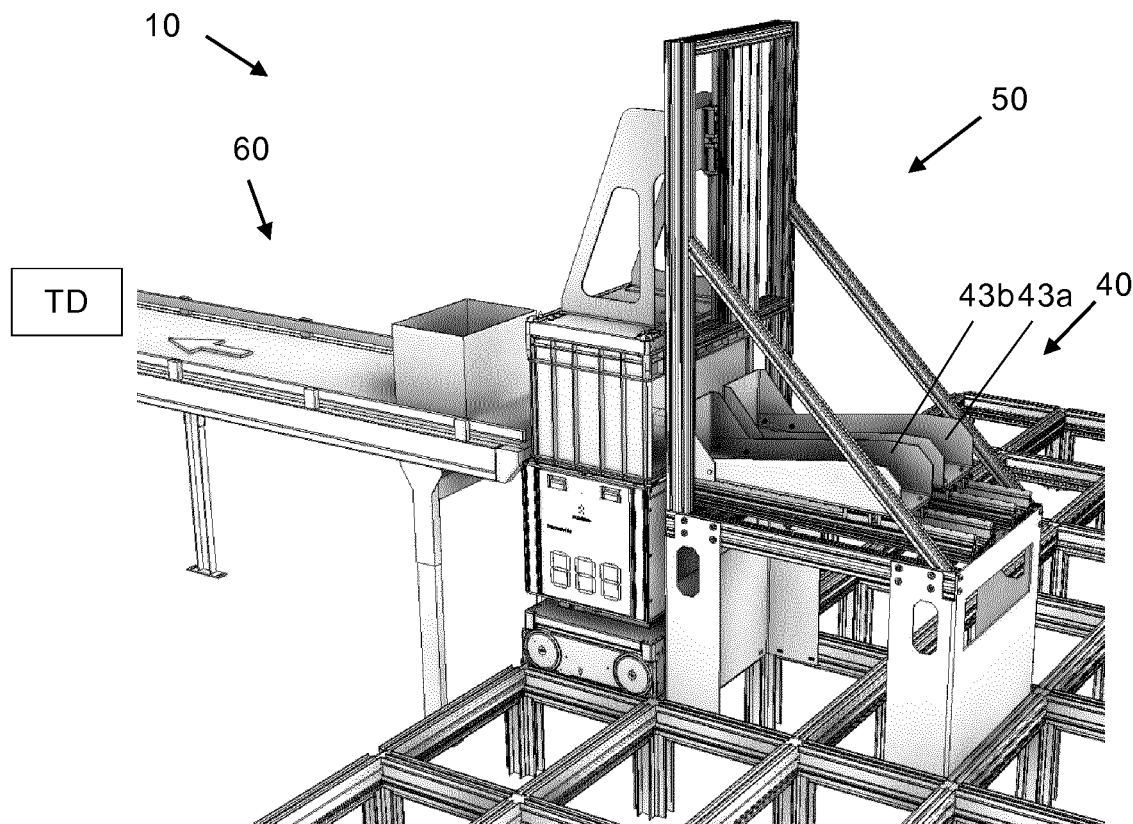
Fig. 8h
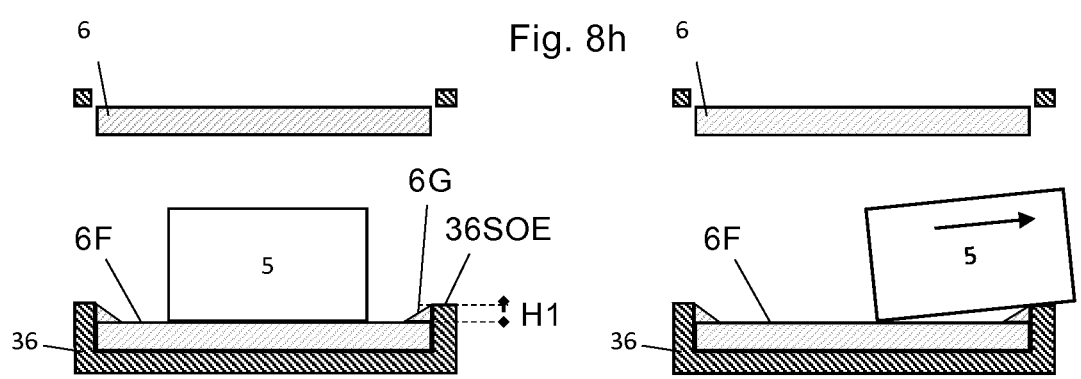
Fig. 9a
Fig. 9b

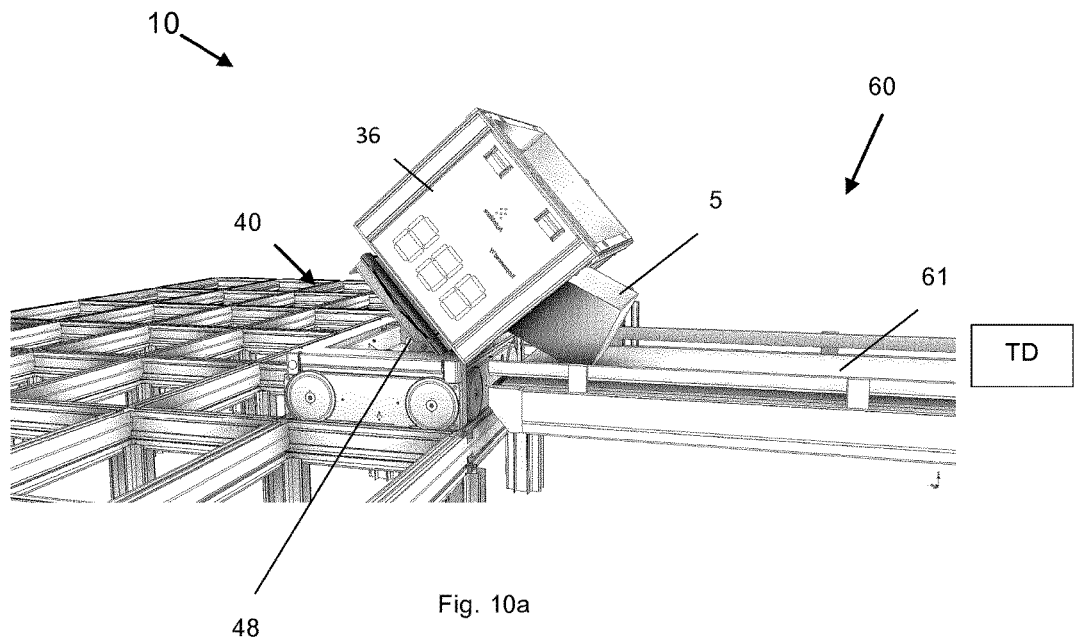
Fig. 10a
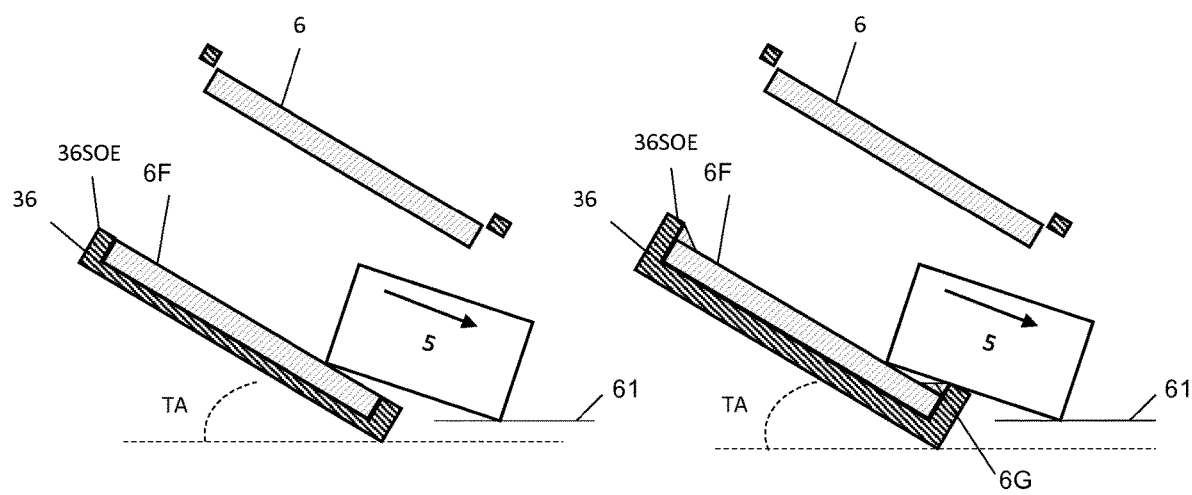
Fig. 10b
Fig. 10c

UNLOADING ARRANGEMENT AND UNLOADING STATION, AS WELL AS METHOD OF UNLOADING AN ITEM FROM A STORAGE CONTAINER

TECHNICAL FIELD

The present invention relates to an automated storage and retrieval system for storage and retrieval of containers, in particular to an unloading arrangement and an unloading station, as well as an associated method of unloading a product item from a container.

BACKGROUND AND PRIOR ART

FIGS. 1A and 1C disclose a typical prior art automated storage and retrieval system 1 with a framework structure 100. FIGS. 1B and 1D disclose a prior art container handling vehicle 200,300 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a container handling vehicle rail system 108 arranged in a grid pattern across the top of the storage 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns 112 above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 200,300 so that the position of the gripping/engaging devices with respect to the vehicle 200,300 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 200,300 can be said to travel in layer Z=0 and each grid column 112 can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 112, e.g. as is disclosed in WO2014/090684A1.

The rail system 108 may be a single track system, as is shown in FIG. 2A. Alternatively, the rail system 108 may be a double track system, as is shown in FIG. 2B, thus allowing a container handling vehicle 201 having a footprint 202,202' generally corresponding to the lateral area defined by a grid column 112 to travel along a row of grid columns 112 even if another container handling vehicle 200 is positioned above a grid column 112 neighboring that row. Both the single and double track system, or a combination comprising a single and double track arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of neighboring rails defining parallel rows of grid cells running in the X direction, and rails 111a and 111b form pairs of neighboring rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells 122 are arranged in contact with each other such that there is no space there-between.

In a storage grid 104, a majority of the grid columns 112 are storage columns 105, i.e. grid columns 112 where storage containers 106 are stored in stacks 107. However, a grid 104 normally has at least one grid column 112 which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column 112 in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station (not shown), and the second delivery column 120 may comprise a dedicated pick-up port where the container handling vehicles 200,300 can pick up storage containers 106 that have been transported through the delivery column 120 from an access or a transfer station (not shown). Each of the ports of the first and second delivery column 119,120 may comprise a port suitable for both pick up and drop of storage containers 106.

The second location may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed.

For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column 119,120 and the access station.

If the lower port of the delivery column 119,120 and the access station are located at different levels, the conveyor system may comprise a lift device for transporting the storage containers 106 vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, disclose an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding delivery columns to the grid, as this will allow the container handling vehicles 200,300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119,120 require the container handling vehicles 200,300 to move to a storage column 105 after drop-off to retrieve a new storage container 106. Likewise, the container handling vehicles 200,300 have to be empty of a storage container 106 when they are sent to a pick-up port 120 to pick up a storage container. This results in an inefficiency and causes increased congestion around the ports, as container handling vehicles 200,300 are moving around on the grid without a storage container 106 as payload. In addition, the delivery columns 119,120 may take up space on the grid 104 which could be used for other purposes such as the movement of container handling vehicles 200,300.

It is known, for example from WO2016/198565, to provide the above automated storage and retrieval system with a robot device comprising a movable arm with a picking mechanism in one end thereof, for moving product items between storage containers 106. The robot device can be fixed to the grid or it can be fixed to the ceiling of the building in which the grid is located. The robot device in this prior art is used to move product items between storage containers 106 located on the top level of the grid and storage containers 106 located on a conveyor belt of a conveyor system.

Also here, the area surrounding the robot device may become congested with container handling vehicles 200,300 instructed to drop off or pick up storage containers 106. Moreover, adding conveyor system infrastructure is costly.

GB 2544648 (Ocado Innovation) discloses an automated storage and retrieval system with a robot device for picking product items where the robot device is fixed to a robot vehicle, thereby forming a picking vehicle. Container handling vehicles are moved adjacent to this picking vehicle and the picking vehicle moves product items between the containers held by the container handling vehicles. The container handling vehicles comprise a top opening allowing the picking vehicle to access the container from above.

It is also known from the above publication that product items are picked from a container into a plurality of end-customer shipping packages located in the destination container. The destination container with these shipping packages is then transported to a port where the shipping packages are retrieved from the container, before they are closed, and possibly addressed and stamped. This is typically a manual operation.

One object of the invention is to provide a more efficient unloading of the containers in such automated storage and retrieval systems. This is typically achieved by reducing the distance the containers are transported and by reducing manual working operations. This can also be achieved by reducing space of equipment in the automated storage and retrieval system, as this typically will allow more container handling vehicles to operate in the system.

SUMMARY OF THE INVENTION

It is described an unloading arrangement comprising: a delivery vehicle; a storage container carried by the delivery vehicle; and an unloading station for unloading an item from the storage container while it is being carried by the delivery vehicle in an automatic storage and retrieval system, the unloading station comprising: an unloading device; and a destination conveyor configured to convey the item to a target destination, wherein the unloading device is configured to move the item through a side opening of the storage container to the destination conveyor.

As an alternative to a delivery vehicle which carries storage containers above, it is possible to use the container handling vehicle with a cantilever construction (see FIG. 1D). When the storage container is in the uppermost position below the cantilever part, the unloading device may be used to move the item(s) through a side opening (on the relatively smaller side(s) of the storage container) to the destination conveyor. The storage container may comprise: a floor; a top opening; two first parallel side walls; and two side openings, one in each of the first parallel side walls.

The delivery vehicle may comprise a container carrier, wherein the container carrier may comprise: a carrier floor; a carrier top opening; two first carrier parallel side walls; two second carrier parallel side walls; two carrier side openings, one in each of the first carrier parallel side walls, each of the carrier side openings comprising a lower edge and an upper edge.

The purpose of the unloading device is to move the item through the side opening of the storage container and through the side opening of the container carrier and further to the destination conveyor. If the delivery vehicle does not have a dedicated container carrier with side walls etc, the purpose of the unloading device is to move the item through the side opening of the storage container only and onto the destination conveyor.

The side opening(s) in the storage container may be as large as practically possible, and may span over the whole width of the side of the storage container. The height of the side opening may extend as far as possible without affecting the upper portion of the storage container, which upper portion is arranged to interact with gripper(s) on lifting frame of the container handling vehicle.

Alternatively, one side of the storage container may comprise two or more side openings. The different side openings may be separated by one or more structural element such as a vertical rod or beam or similar. The structural element(s) may e.g. be provided for increased rigidity, strength or stability of the storage container. In addition, if the storage container is divided into two or more separate storage compartments, each of the storage compartments may comprise one dedicated side opening.

The storage container may have a rectangular shape where each of a pair of sides are parallel and of equal size. The side openings in the storage container may be arranged on two opposite sides, i.e. either on the two relatively largest sides or on the two relatively smaller sides.

Alternatively, the storage containers may be of square shape, i.e. all four sides are of same size and both sides of each pair are parallel.

In either case of storage containers, both for rectangular and square shape, it may be arranged side openings on three or on all four sides of the storage container. The storage container will than comprise a floor, four vertical rods or beams in each of the four corners, and an upper portion for interaction with gripper(s) on the lifting frame of the container handling vehicle. An advantage of storage containers with side openings, and in particular if the storage container has a square shape, is that they are not dependent on a specific orientation during lifting, transport and/or unloading.

The unloading device may comprise: a base structure; one or more unloading members, wherein each of the one or more unloading members has a contact surface; and one or more actuators configured to move the one or more unloading members.

The one or more unloading members may comprise: a first unloading member having a first contact surface adapted to the item; and a second unloading member having a second contact surface adapted to the item.

The one or more actuators may comprise: a first actuator configured to move the first unloading member; and a second actuator configured to move the second unloading member.

The actuators may be configured to move the unloading members independently.

The unloading device may further comprise a container lifting device which may comprise: a first frame structure; a container lifting frame having a connection interface configured to connect to the container; and a lifting mechanism configured to lift the container lifting frame relative to the first frame structure.

Alternatively, the unloading device may be provided as a tilting or pivoting device mounted between the vehicle body and the container carrier. In this way, the item may slide out from the container and container carrier and further onto the conveying device.

The container lifting device may further comprise a second frame structure, wherein the container lifting frame may be fixed below the second frame structure, and wherein the lifting mechanism may be configured to move the second frame structure up and down relative to the first frame structure.

The container lifting device may be configured to lift the container to a height where the floor of the storage container is horizontally aligned with the lower edge of the side opening.

As the lower edge of the side opening in the container carrier is preferably horizontally aligned with the floor of the storage container when the storage container is provided in the container carrier, the item can easily be pushed out through the side openings.

The automated storage and retrieval system may comprise a storage grid and the base structure can be fixed to the storage grid.

It is described an unloading station for unloading an item from a storage container while it is being carried by a delivery vehicle in an automatic storage and retrieval system, the unloading station may comprise: a rail system comprising a plurality of rails defining an arrangement of grid cells; an unloading device arranged on one side of a grid cell; and a destination conveyor arranged on an opposite side of a grid cell and configured to convey the item to a target destination, wherein the unloading device is configured to move the item through a side opening of the storage container to the destination conveyor.

It is described a method of unloading an item from a storage container, the method comprising: carrying the storage container to an unloading station, the container being carried by a delivery vehicle; moving the item through a side opening of the storage container to a destination conveyor of the unloading station, the item being moved by an unloading device; conveying the item to a target destination.

The storage container to be used in the method may comprise: a floor; a top opening; two first parallel side walls; and two side openings, one in each of the first parallel side walls.

The unloading device to be used in the method may comprise: a base structure; one or more unloading members, wherein each of the one or more unloading members has a contact surface; and one or more actuators configured to move the one or more unloading members.

The present invention also relates to a remotely operated delivery vehicle for transport of a storage container between an automated storage and retrieval grid configured to store a plurality of stacks of storage containers, and a second location for handling of the storage container by at least one of a robotic operator and a human operator, the remotely operated delivery vehicle comprising;
  rolling devices configured to move the remotely operated delivery vehicle in a horizontal plane along tracks of a delivery rail system comprising a first set of parallel rails arranged in a first direction and a second set of parallel rails arranged in a second direction orthogonal to the first direction,
  rolling device motors for driving the rolling devices and
  a power source configured to provide propulsion power to the rolling device motors,
  where the remotely operated delivery vehicle further comprises a container carrier configured to receive the storage container onto or at least partly into the container carrier;
  characterized in that the container carrier comprises:
  two first carrier parallel side walls;
  two second carrier parallel side walls;
  two carrier side openings, one in each of the first carrier parallel side walls, each of the carrier side openings comprising a lower edge and an upper edge.

In one aspect, the second location is an unloading station comprising:
  an unloading device; and
  a destination conveyor;
  where the unloading device is configured to move an item stored in the storage container through a side opening of the storage container and one of the side openings of the container carrier to the destination conveyor.

In one aspect, the lower edge of the carrier side openings is aligned with a floor of the storage container during movement of the item by means of the unloading device.

BRIEF DESCRIPTION OF THE DRAWINGS

The following drawings depict exemplary embodiments of the present invention and are appended to facilitate the understanding of the invention.

FIG. 1C shows the complete system and FIG. 1B and FIG. 1D shows examples of system operable prior art container handling vehicles.

FIG. 2A shows a single track system, FIG. 2B shows a double track system 2B and FIG. 2 C shows a double track system indicated width and length of a container handling vehicle grid cell.

FIG. 8a-h show the operation of a third embodiment.

FIGS. 9a and 9b show an alternative embodiment.

FIGS. 10a, 10b and 10c show yet an alternative embodiment.

DETAILED DESCRIPTION OF THE INVENTION

Figure 1:
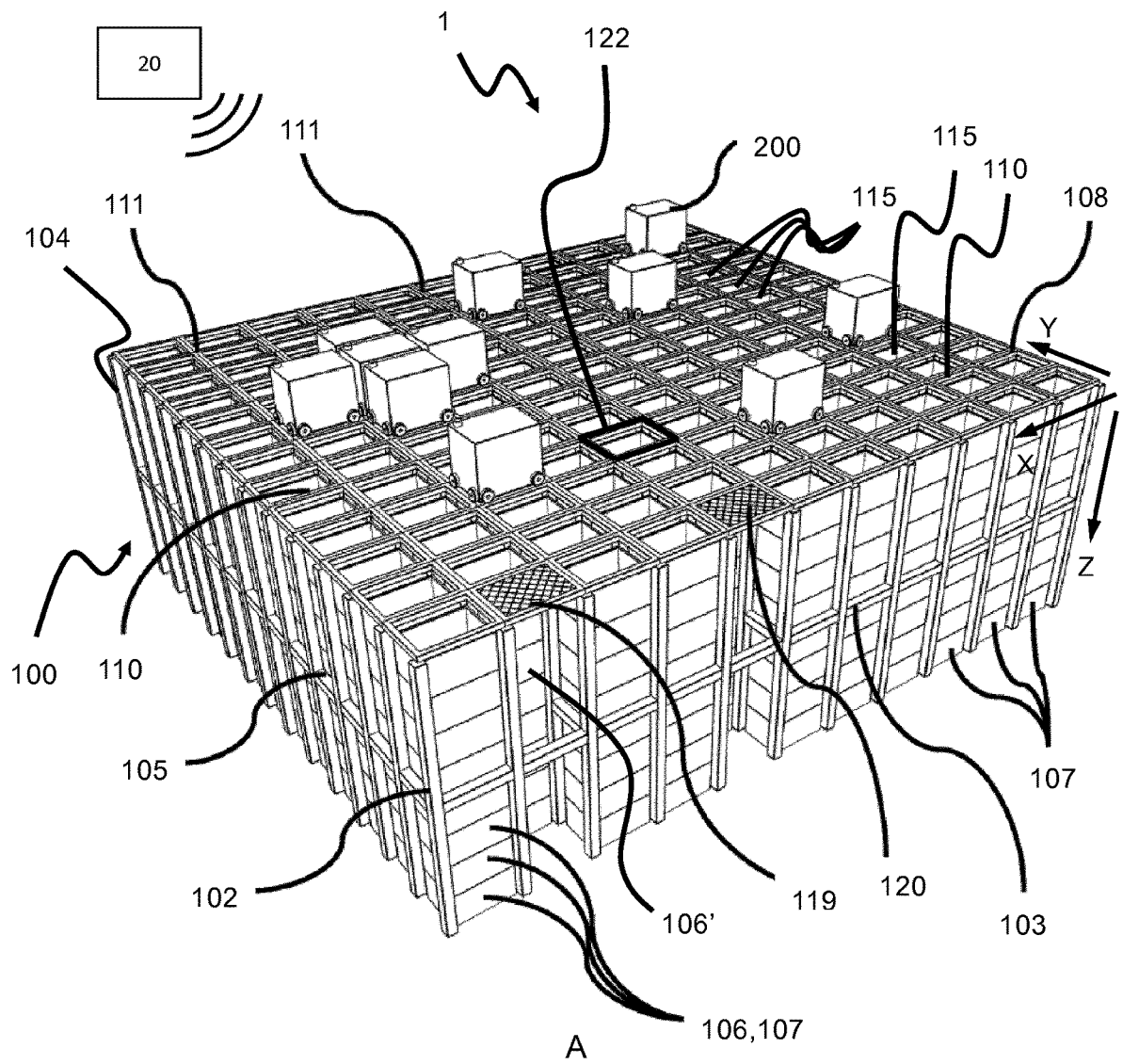
FIG. 1 A-D are perspectives view of a prior art automated storage and retrieval system, where FIG. 1A
Figure 1:
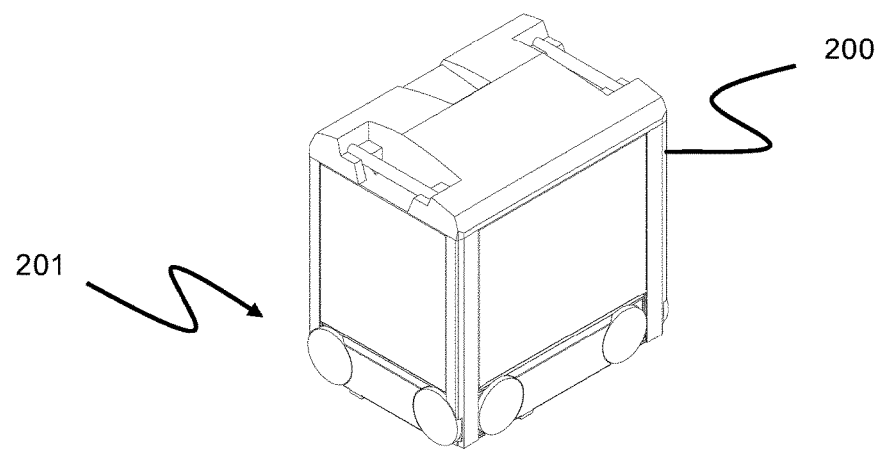
Figure 1:
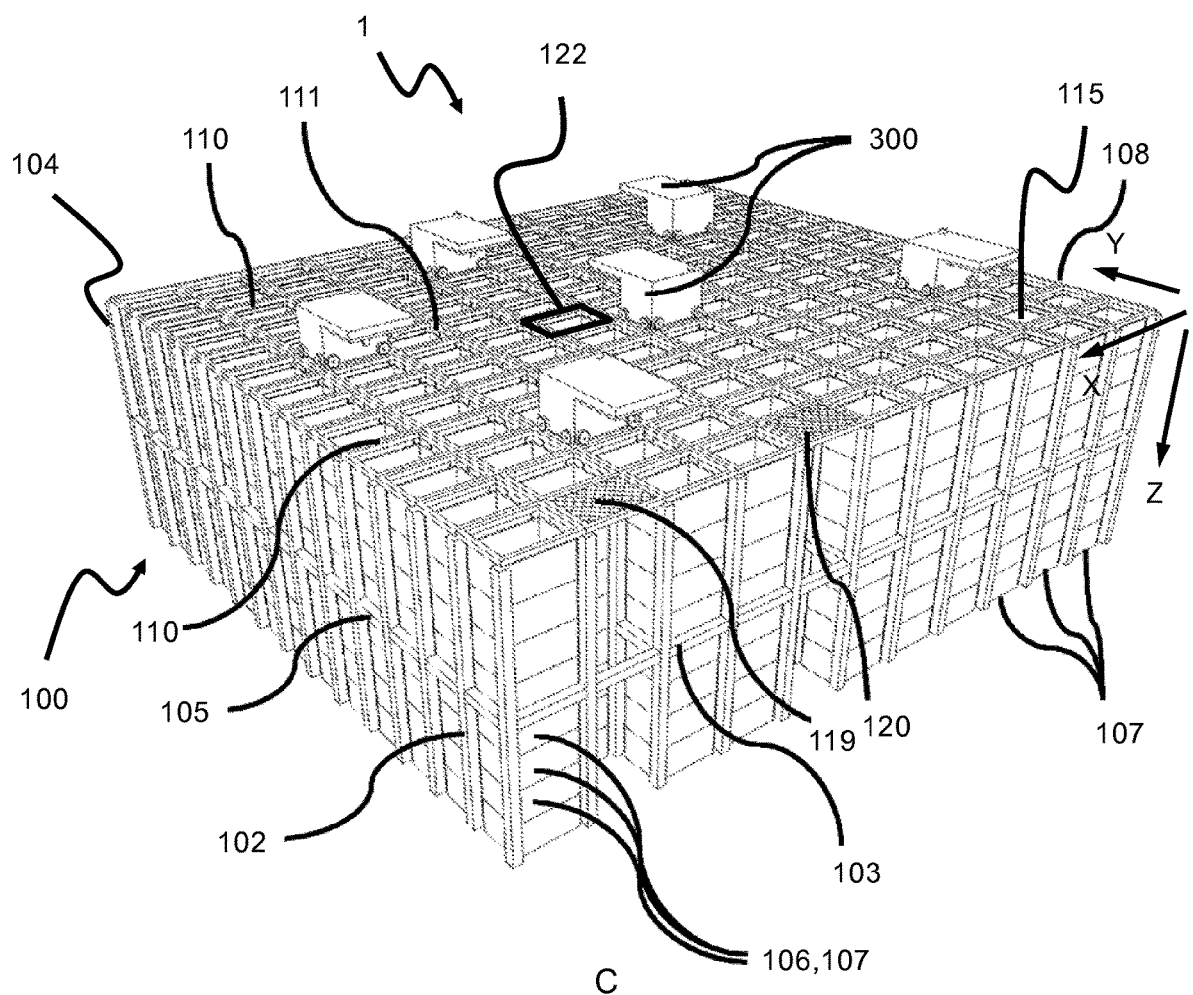
Figure 1:
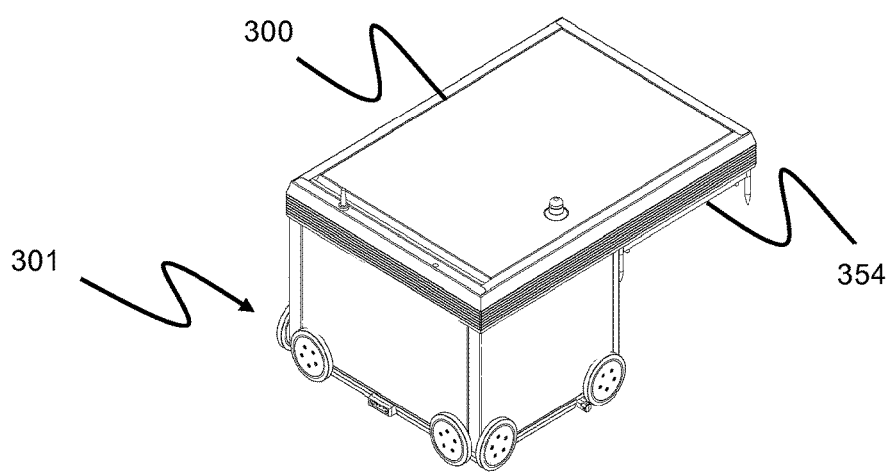

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

Figure 2:
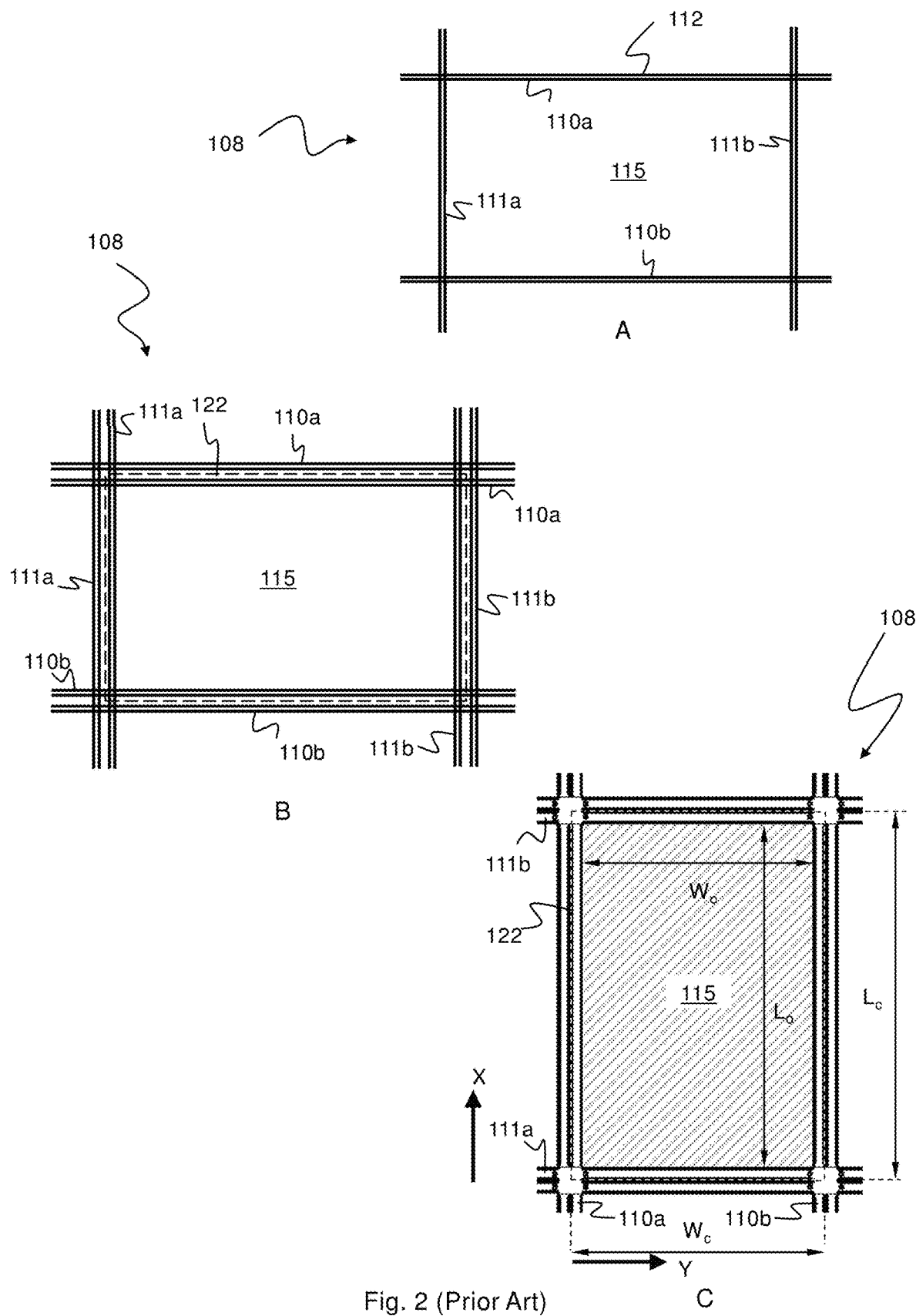
FIG. 2 A-C is a top view of a container handling vehicle rail system, where

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIG. 2). In FIGS. 1A and 1C, such a grid cell 122 is marked on the rail system 108 by thick lines.

The container handling vehicle rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

The rail system 108 may be a single track system, as is shown in FIG. 2A, a double track system, as is shown in FIG. 2B, or a combination of the single and double track systems.

Details of the various track systems are disclosed this specification under the section of background and prior art.

In FIG. 1A, a control system of the automated storage and retrieval system 1 is shown as a box 20 provided in communication with the vehicles 200, 300.

First Embodiment

Figure 3:
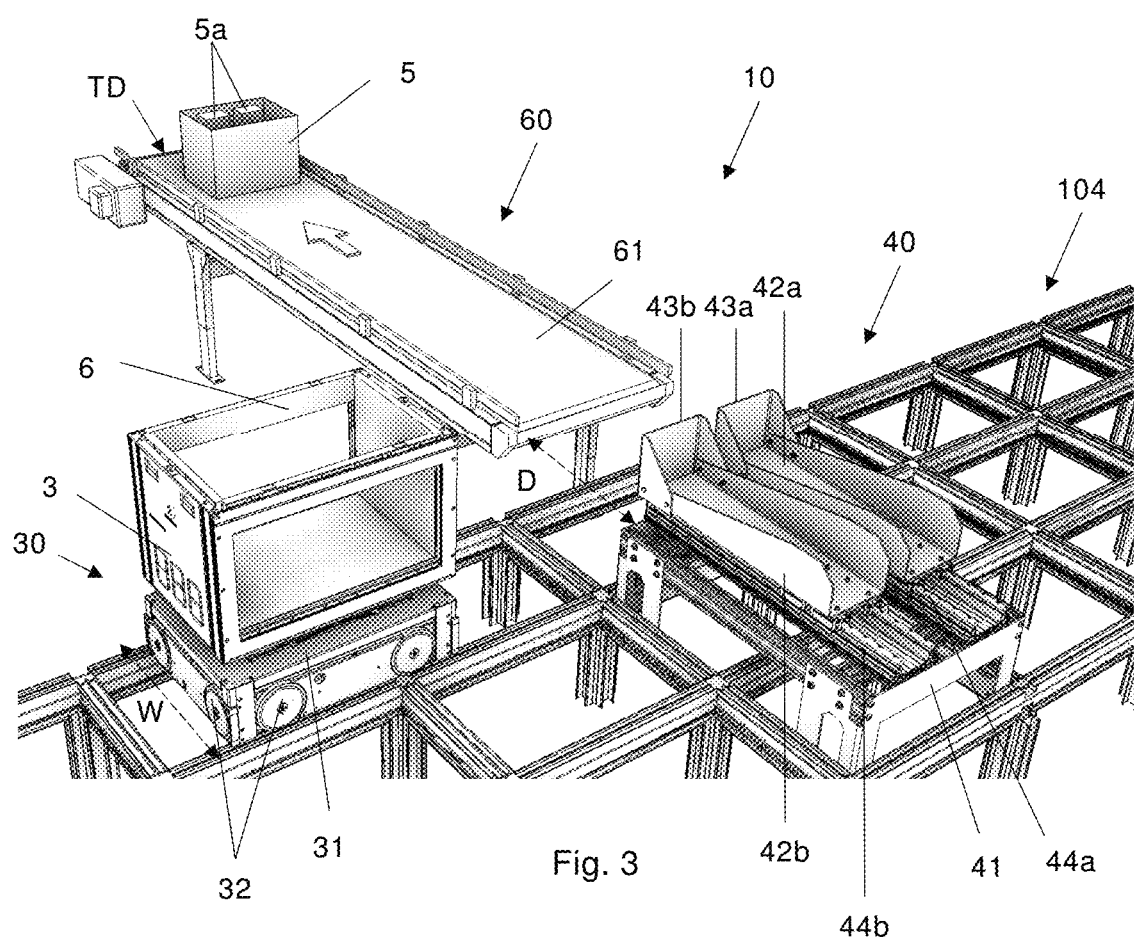
FIGS. 3 and 4 are perspective views of a first embodiment of the present invention—in FIG. 3 the container is carried by a delivery vehicle while in FIG. 4 the container is shown isolated from the delivery vehicle.
Figure 4:
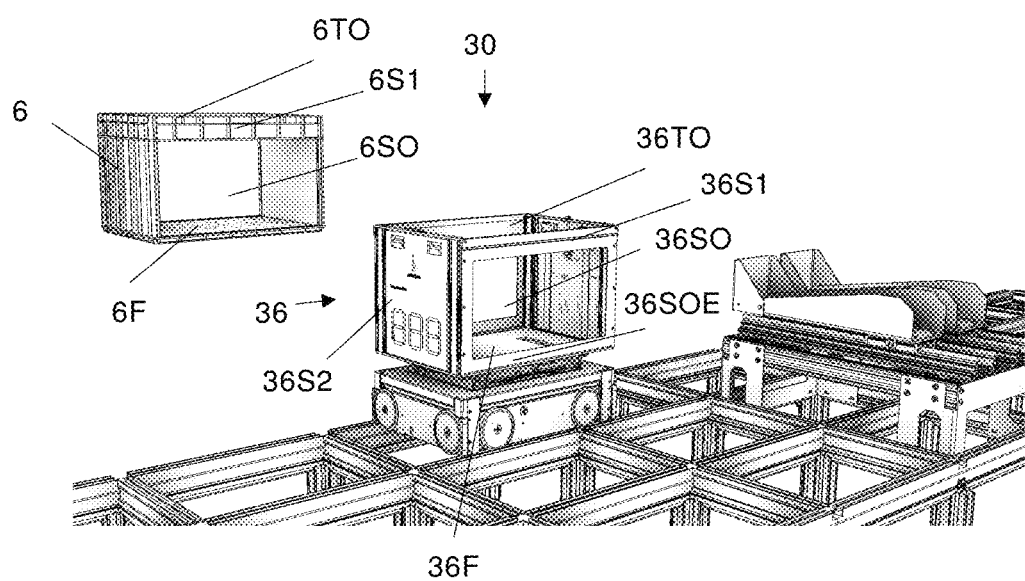

It is now referred to FIGS. 3 and 4. Here, it is shown an unloading station 10 for an automated storage and retrieval system 1.

The unloading station 10 comprises an unloading device generally indicated with arrow 40 and a destination conveyor generally indicated with arrow 60.

It is also shown a remotely operated vehicle in the form of a delivery vehicle 30. The delivery vehicle 30 comprises a vehicle body 31 and a wheel arrangement 32 connected to the vehicle body 31. The wheel arrangement 32 is configured to move the remotely operated vehicle 30 along the rail system 108 of the automated storage and retrieval system 1 or along a corresponding rail system 108 located below or adjacent to the grid 104. The wheel arrangement 32 is considered to be prior art and will not be described further in detail herein.

The delivery vehicle 30 comprises a container carrier 36 located above the wheel arrangement 32. It should be noted that the delivery vehicle 30 in the present embodiment is different from the above vehicles 200, 300 in that the vehicle 30 itself does not comprise a lifting device for lowering and elevating a storage container with respect to the grid 104. In the present embodiment, the vehicle 30 is of a type adapted to receive a storage container 6 from above or to return a storage container 6 upwardly—by means of a separate lifting device. The lifting device used for this operation can for example be a lifting device of the prior art vehicles 200, 300, provided that the vehicle 30 is located below one of the vehicles 200, 300. Another example of such a lifting device will also be described further in detail below.

In the present embodiment, the container carrier 36 comprises two first parallel side walls 36S1 each having a side opening 36SO and two second parallel side walls 36S2 perpendicular to the first side walls 36S1. The two second sidewalls 36S2 do not have side openings. In addition, the container carrier comprises a floor 36F and a top opening 36TO for receiving and delivering a storage container 6. In the present embodiment, a lower edge 36SOE of the side opening 36SO is horizontally aligned with the floor 6F of the storage container 6 when the storage container 6 is provided in the container carrier 36.

The storage container 6 is here similar to the prior art storage containers 106 described above, with one difference—the storage container 6 comprises two side openings 6SO in its two first parallel side walls 6S1. As shown in FIG. 4, the storage container has a floor 6F and a top opening 6TO.

The unloading device 40 will now be described. The unloading device 40 comprises a base structure 41 which may be fixed to grid 104 or to the rail system 108. The unloading device 40 further comprises a first unloading member 42a having a first contact surface 43a and a second unloading member 42b having a second contact surface 43b. The contact surfaces 43a, 43b are adapted to the item 5. For the planar cardboard box in FIG. 3, the contact surfaces 43a, 43b are planar.

The unloading device 40 further comprises a first actuator 44a configured to move the first unloading member 42a in relation to the base structure 41 and a second actuator 44b configured to move the second unloading member 42b in relation to the base structure 41.

In addition, the unloading device 40 comprises a control system for controlling the first and/or second actuator 44a, 44b. This control system may be the control system 20 of the automated storage and retrieval system 1 shown in FIG. 1, which is also controlling the movement of the vehicles with respect to the unloading device 40.

It should be noted that there can be one such unloading member 42 or there can be three or more such unloading members 42. In an automated storage and retrieval system 1, there may be several such unloading stations 10, where some unloading stations 10 have one unloading member 42 to be used for larger items 5, while other unloading stations 10 have several unloading members 42 to be used for smaller items 5. Moreover, the contact surface 43 of some unloading members 42 may be designed for one specific type of item 5.

It should also be noted that the unloading members 42a, 42b of FIG. 3 may be moved in parallel when unloading larger items and may be moved one by one when unloading smaller items.

The purpose of the unloading device 40 is to move an item 5 stored in the storage container 6 through the side opening 36SO of the container carrier 36 and through the side opening 6SO of the storage container 6 and further to the destination conveyor 60. As the lower edge 36SOE of the side opening 36SO is horizontally aligned with the floor 6F of the storage container 6 when the storage container 6 is provided in the container carrier 36, the item 5 can easily be pushed out through the side openings 6SO and 36SO.

In the first embodiment, the first and second actuators 44a, 44b are linear actuators moving the unloading members 42a, 42b linearly. The linear movement may be in the horizontal plane.

The destination conveyor 60 will now be described. The destination conveyor 60 here comprises a belt conveyor 61 which in one ends receives an item 5 and conveys it to its second end, which hereinafter is referred to as a target destination TD.

In FIG. 3, an item 5 in the form of a shipping package containing two product items 5a is shown at the target destination TD. Here, before arrival to the unloading station 10, product items 5a have been picked from storage containers 106 stored in the grid 104 into the shipping package 5 provided in the storage container 6, which then has been transferred to the unloading station 10 by means of the vehicle 30 for unloading of the shipping package to the destination conveyor 60.

It should be noted that the shipping package 5 here is a cardboard box which is one example of a shipping package which may be used to ship product items 5a. Other examples of such shipping packages are boxes or bags made of plastic or paper, lined envelopes etc. The unloading station 10 can be used independent of how the product items were picked into the shipping packages, the picking operation may be an automated picking process or a manual picking process. Hence, in some cases, no picking operation takes place before the storage container 6 is moved to the unloading station.

Figure 5:
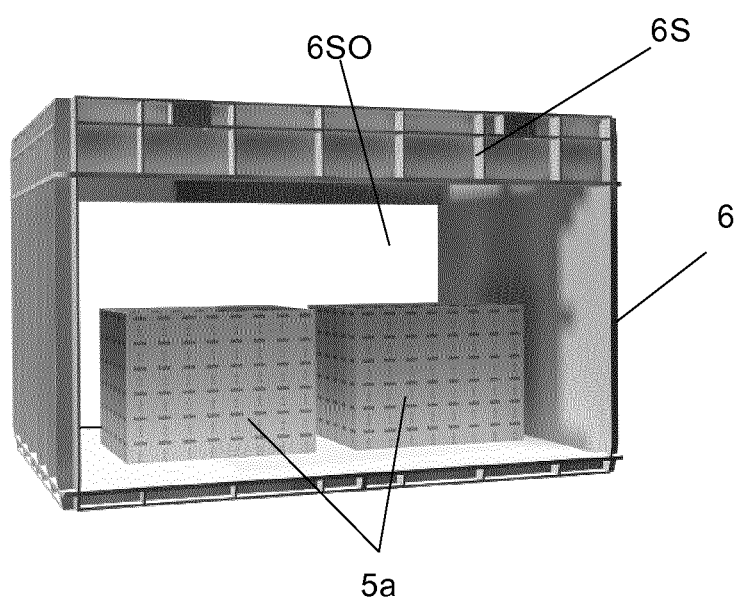
FIG. 5 is an enlarged view of the container containing two shipping packages.

It should also be mentioned that some product items 5a do not need a further shipping package 5 before shipping. One such example is shown in FIG. 5. Here, two product items 5a have been prepackaged into respective shipping packages and stored in a storage container 6 and/or storage container 106 before arrival into the automated storage and retrieval system. Here, the product items 5a may be unloaded directly from the storage container 6 to the destination conveyor. Hence, the term "item" is here referring to both product items 5a and shipping packages 5 containing one or several such product items 5a.

Is should be noted that the destination conveyor 60 may comprise a roller conveyor or other types of conveying means for conveying the item to the target destination TD. Moreover, it should be noted that the target destination TD is the target destination of the unloading station 10. The item 5 may be transferred to further destinations, for example a station where the shipping packages are closed, addressed and/or prepared for dispatch by postal services or delivery services, to pickup points etc.

In FIG. 3, the distance D between the contact surfaces 43a, 43b in their deactivated position and the destination conveyor 60 is slightly larger than the width W of the vehicle 30, thereby allowing the vehicle 30 to move between the destination conveyor 60 and the unloading device 40 while at the same time helping to avoid items 5 being able to fall onto the floor below the unloading station 10.

In addition, the height of the belt conveyor 61 is aligned with the height of the floor 6F of the storage container 6.

Figure 6A:
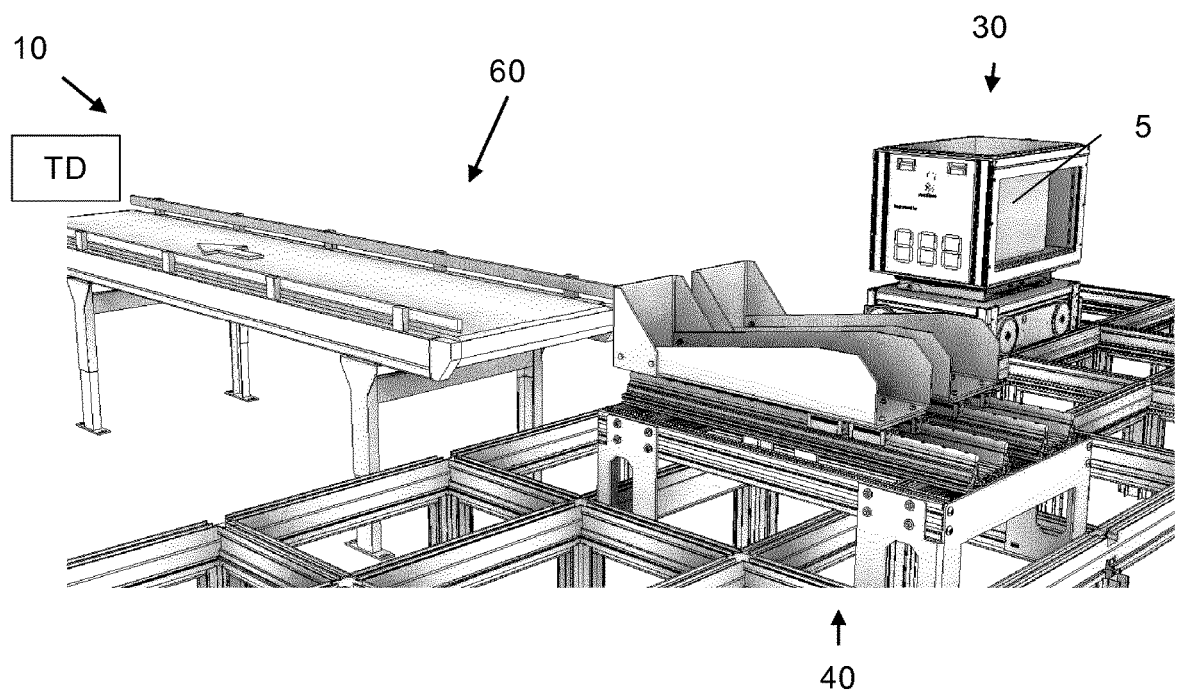
FIG. 6a-d show the operation of the first embodiment.

The operation of the unloading station 10 will now be described. In FIG. 6a, the vehicle 30 with a storage container 6 containing one item 5 is controlled by the control system 20 to move to the unloading station 10.

Figure 6B:
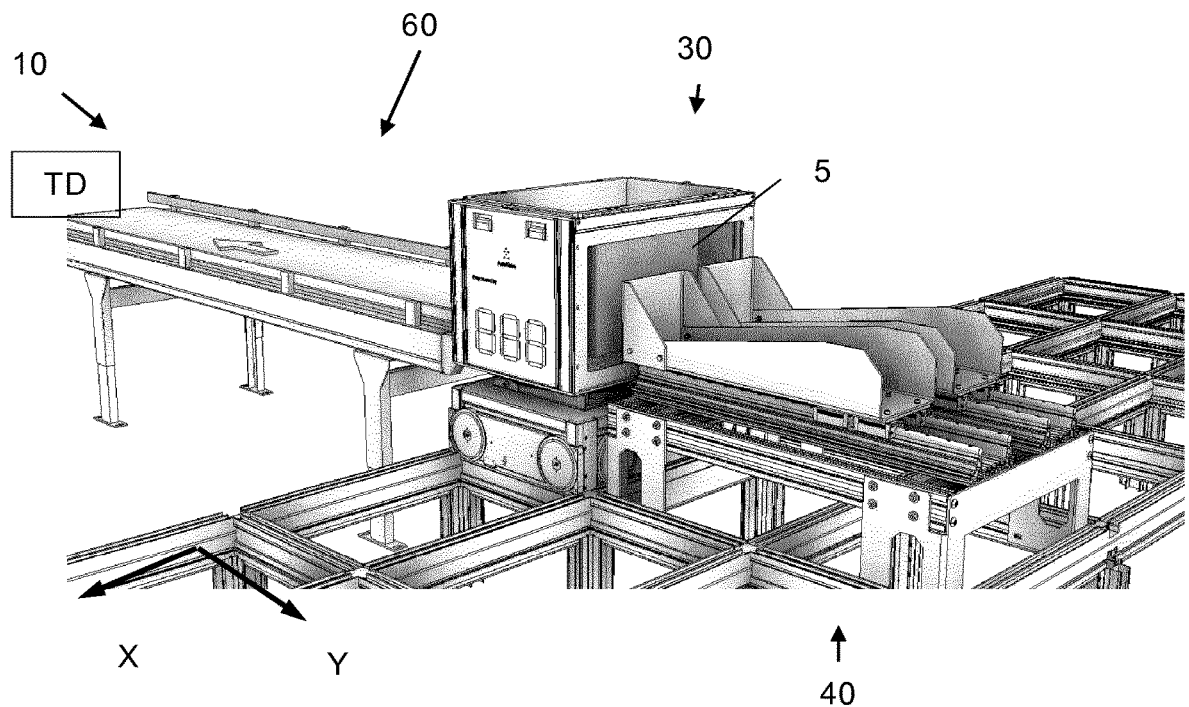

In FIG. 6b, the vehicle 30 has stopped at an unloading position between the destination conveyor 60 and the unloading device 40.

Figure 6C:
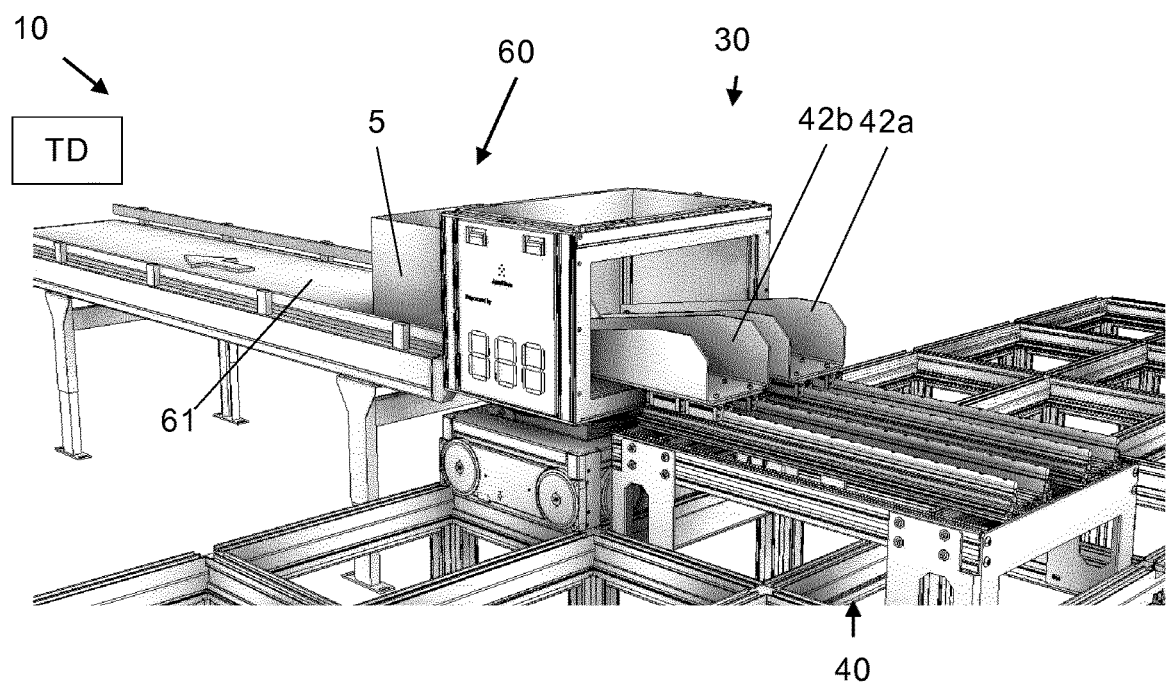

In FIG. 6c, the unloading members 42a, 42b have moved linearly in parallel into the side openings 36SO and 6SO, thereby pushing the item 5 out from the storage container 6 and the container carrier 36 and onto the belt conveyor 61.

Figure 6D:
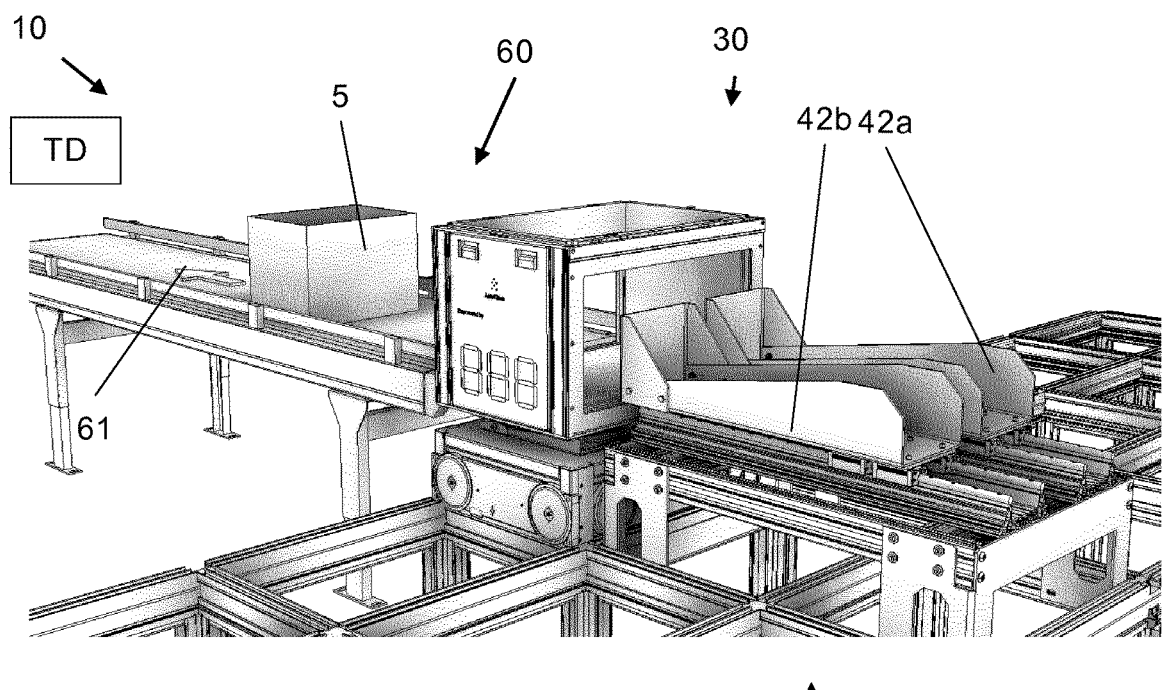

In FIG. 6d, the unloading members 42a, 42b have moved back to its initial position while the conveyor belt is moving the item 5 towards its target destination TD.

Then, in a final step shown in FIG. 3, the vehicle 30 is moving away from the unloading station 10 and the item 5 has reached its target destination TD.

One advantage of the unloading station 10 of the first embodiment described above is that it is relatively simple. One small disadvantage with the first embodiment may be that there is a risk that items 5 may slide out through the side openings 6SO, 36SO during acceleration and deceleration, in particular in the Y-direction shown in FIG. 6b. This can be avoided by keeping the acceleration and deceleration of the vehicle 30 relatively low.

Another way of overcoming this advantage is to provide the floor 6F of the storage container 6 with a material which increases the friction between the floor 6F and the items 5. The second embodiment described below provides yet an alternative solution to this disadvantage.

Second Embodiment

Figure 7A:
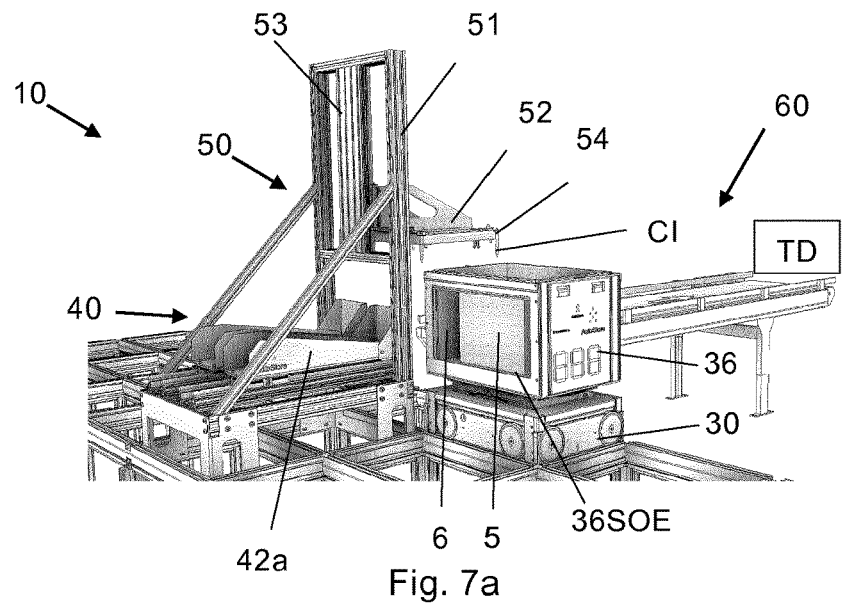
FIG. 7a-g show the operation of a second embodiment.
Figures 7B, 7C:
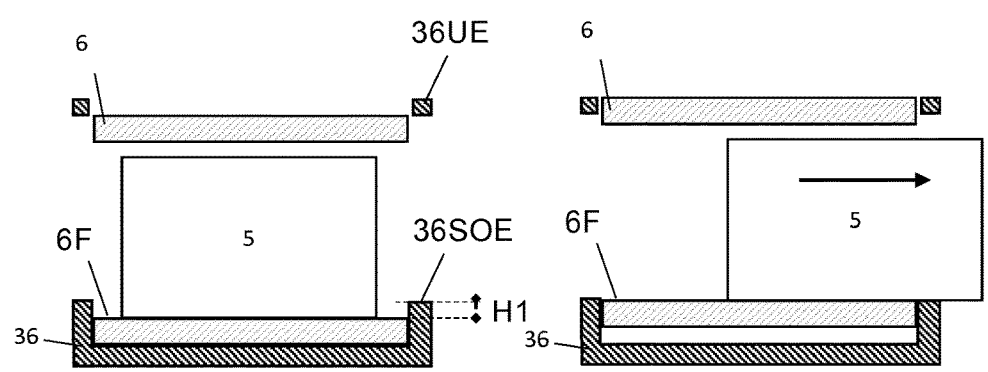

It is now referred to FIGS. 7a, 7b and 7c. The unloading station 10 is here similar to the unloading station 10 of the first embodiment, and only the differences will be described herein in detail.

In the present embodiment, the lower edge 36SOE of the side opening 36SO is not horizontally aligned with the floor 6F of the storage container 6 when the storage container 6 is provided in the container carrier 36. Instead, the lower edge 36SOE of the side opening 36SO is provided at a height H1 above the floor 6F of the storage container 6, as shown in FIG. 7b. In this way, if the item 5 provided in the storage container 6 are sliding due to acceleration and deceleration of the vehicle 30, the lower edge 36SOE will prevent the item 5 from sliding further out through of the side opening 36SO of the container carrier 36. Thus, another object of the invention is solved in that it is avoided that product items fall out of the container during shipping or transportation of the container.

In the present embodiment, the unloading station 10 comprises a container lifting device 50 for lifting of the storage container 6 up from the vehicle 30. As shown in FIG. 7c, the lifting height of the storage container 6 corresponds to the height H1, i.e. the container lifting device 50 is configured to lift the storage container 6 till a height where the floor 6F of the storage container 6 is horizontally aligned with the lower edge 36SOE of the side opening 36SO. In the lifted position shown in FIG. 7c, the item 5 can be easily pushed out through the side openings 6SO and 36SO by means of the unloading device 40.

In FIG. 7a, it is shown that the container lifting device 50 comprises a first frame structure 51 fixed to the base structure 41 of the unloading device 40 and protruding upwardly with respect to the grid 104. It should be noted that in an alternative embodiment, the first frame structure 51 could be fixed to the grid 104 or to another fixed structure close to the unloading device 40.

The container lifting device 50 comprises a container lifting frame 54 with a connection interface CI for connection to and disconnection from the storage container 6. In the present embodiment, the container lifting frame 54 is of the same type of the container lifting frame 354 of container handling vehicle 300 shown in FIG. 1D. The container lifting frame 54 is fixed below a second frame structure 52, where the second frame structure 52 is movable up and down in relation to the first frame structure 51 by means of a lifting mechanism 53. The lifting mechanism 53 may be an electric motor, a linear electric or electrohydraulic actuator etc.

In the present embodiment, the height of the unloading members 42a, 42b above the grid 104 may be adapted to the height of the lower edge 36SOE of the side opening 36SO by increasing the height of the base structure 41. Also, the height of the destination conveyor 60 may be adapted to the height of the lower edge 36SOE.

The operation of the unloading station 10 will now be described. In FIG. 7a, the vehicle 30 with a storage container 6 containing one item 5 is controlled by the control system 20 to move to the unloading station 10.

Figure 7D:
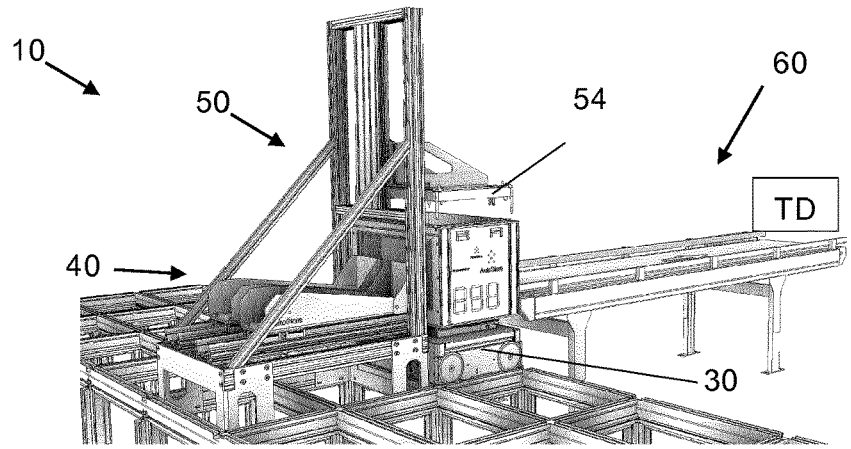

In FIG. 7d, the vehicle 30 has stopped at an unloading position between the destination conveyor 60 and the unloading device 40. The lifting frame 54 is here in an elevated position.

Figure 7E:
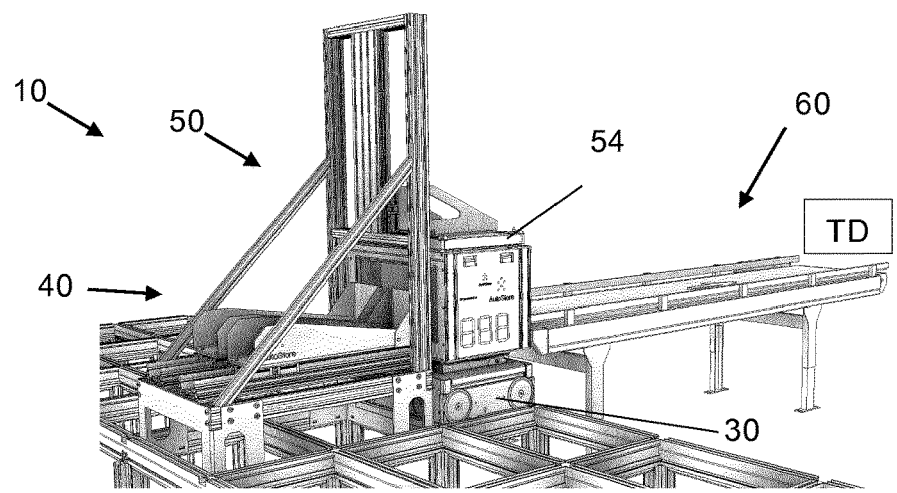

In FIG. 7e, the lifting frame 54 has been lowered and the connection interface CI is connected to the storage container 6.

Figure 7F:
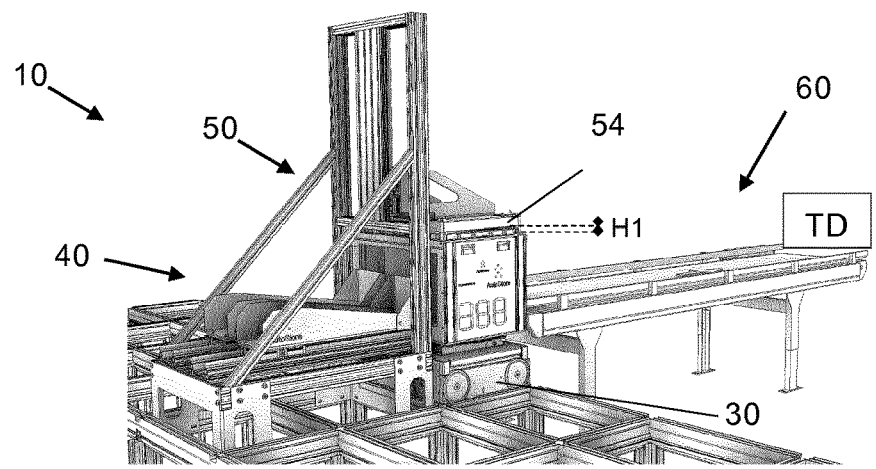

In FIG. 7f, the lifting frame 54 has lifted the storage container upwardly a height H1, corresponding to FIG. 7c.

Figure 7G:
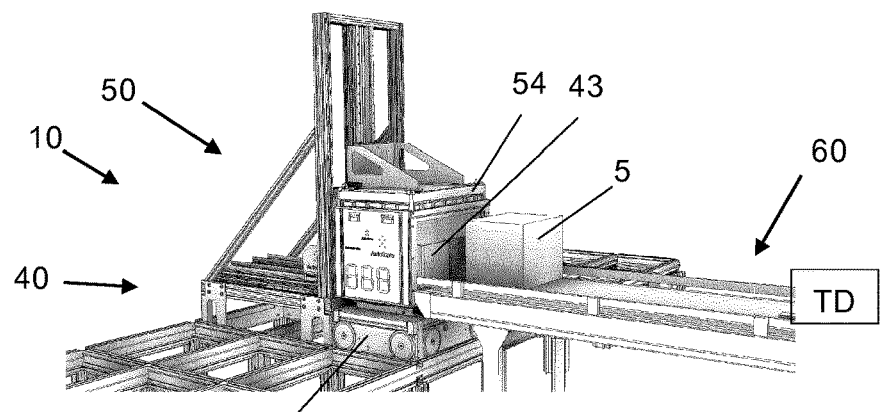

In FIG. 7g, the unloading members 42a, 42b have moved linearly in parallel into the side openings 36SO and 6SO, thereby pushing the item 5 out from the storage container 6 and the container carrier 36 and onto the belt conveyor 61.

When the item 5 has been pushed out and onto the destination conveyor 60, the unloading members 42a, 42b will return to their initial position, the lifting frame 54 will be lowered and the connection interface CI will be disconnected from the storage container 6. After elevating the lifting frame 54 without the storage container 6, the vehicle 30 may move away from the unloading station 10. As described above, the destination conveyor 60 will move the item 5 to its target destination TD.

Third Embodiment

Figure 8A:
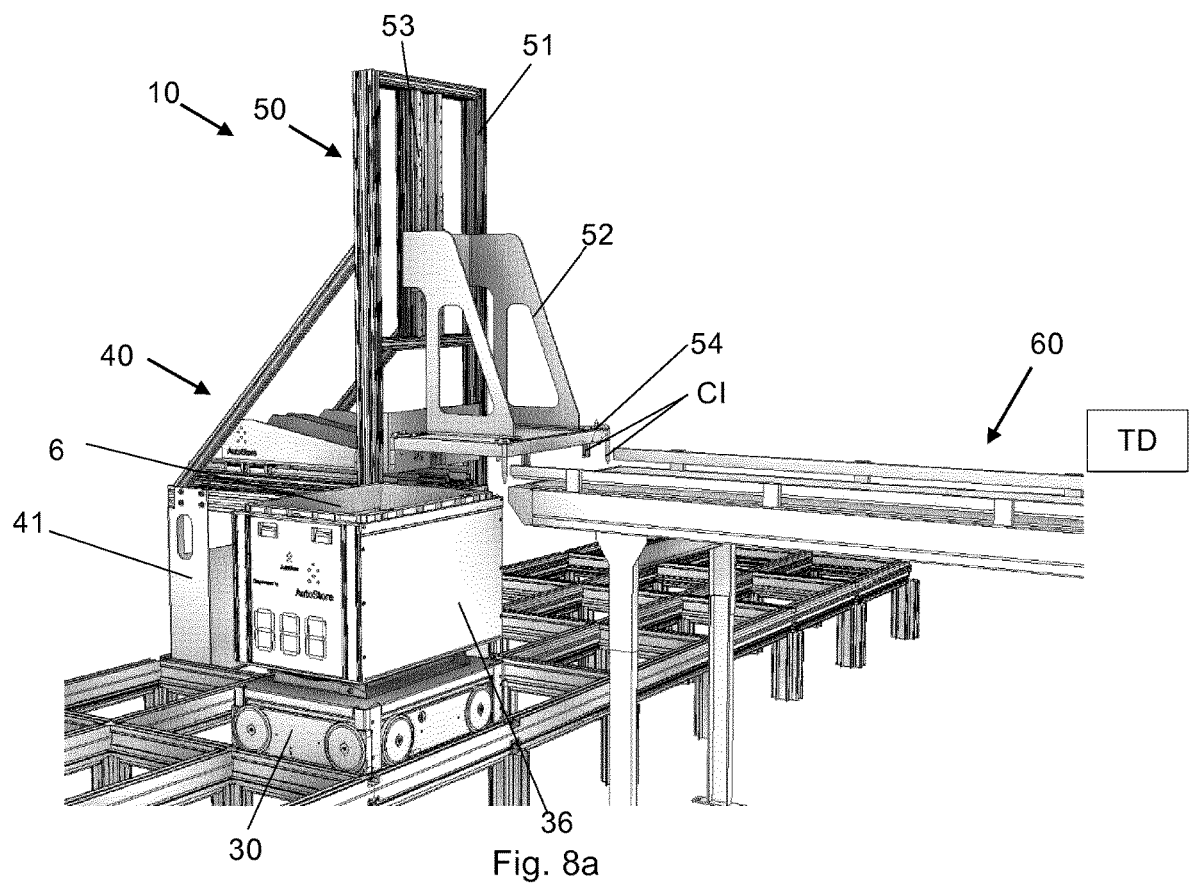
Figures 8B, 8C:
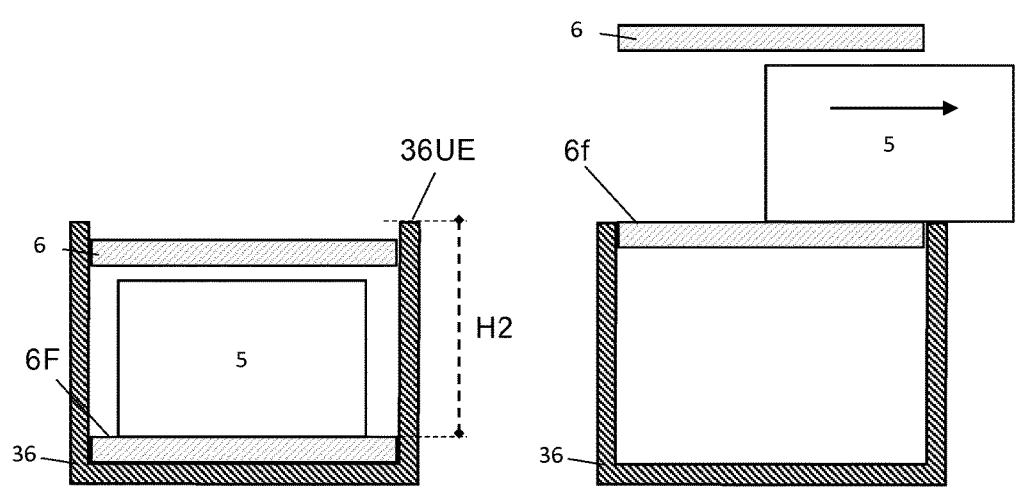

It is now referred to FIGS. 8a, 8b and 8c. The unloading station 10 is here similar to the unloading station 10 of the second embodiment, and only the differences will be described herein in detail.

In the present embodiment, the container carrier 36 of the vehicle 30 is not provided with openings. Here, the storage container 6 is lifted to a height H2 as indicated in FIG. 8b and FIG. 8f by means of the container lifting device 50, in order to horizontally align the floor 6F of the storage container 6 with an upper edge 36UE of the container carrier 36, as shown in FIG. 8c. In this way, if the item 5 provided in the storage container 6 are sliding due to acceleration and deceleration of the vehicle 30, the item 5 will not fall out of the storage container 6 as there are no side openings in the container carrier 36.

In the present embodiment, the height of the unloading members 42a, 42b above the grid 104 are adapted to the height of the upper edge 36UE by increasing the height of the base structure 41. Also the height of the first frame structure 51 and the second frame structure 52 are changed due to the different lifting height H2 of the present embodiment. Also the height of the destination conveyor 60 has been adapted to the height of the upper edge 36UE.

The operation of the unloading station 10 will now be described. In FIG. 8a, the vehicle 30 with a storage container 6 containing one item 5 is controlled by the control system 20 to move to the unloading station 10.

Figure 8D:
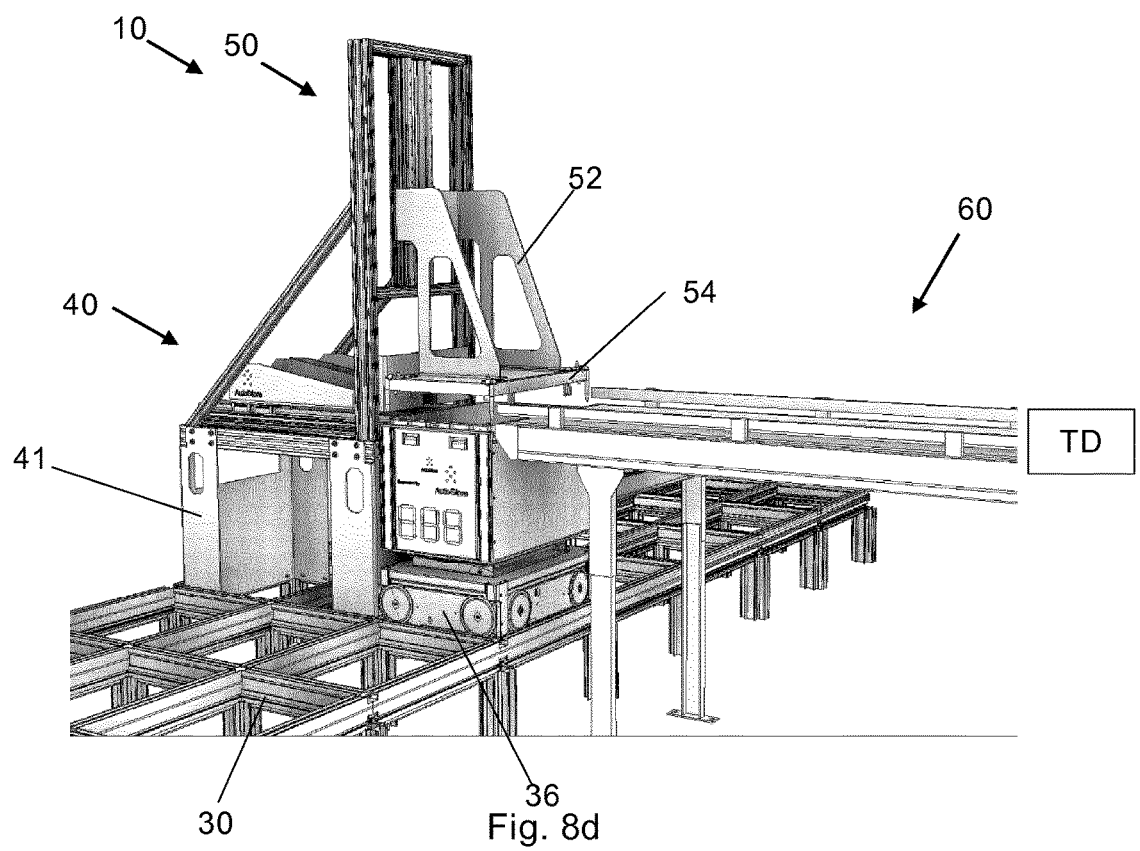

In FIG. 8d, the vehicle 30 has stopped at an unloading position between the destination conveyor 60 and the unloading device 40. The lifting frame 54 is here in an elevated position.

Figure 8E:
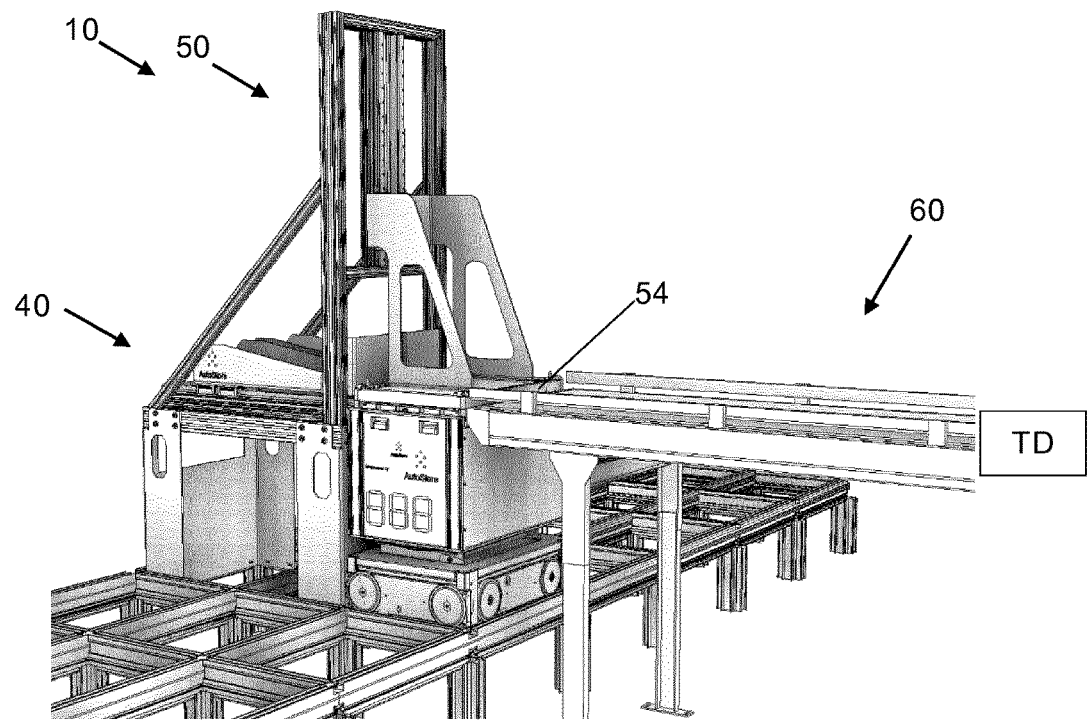
Figure 8F:
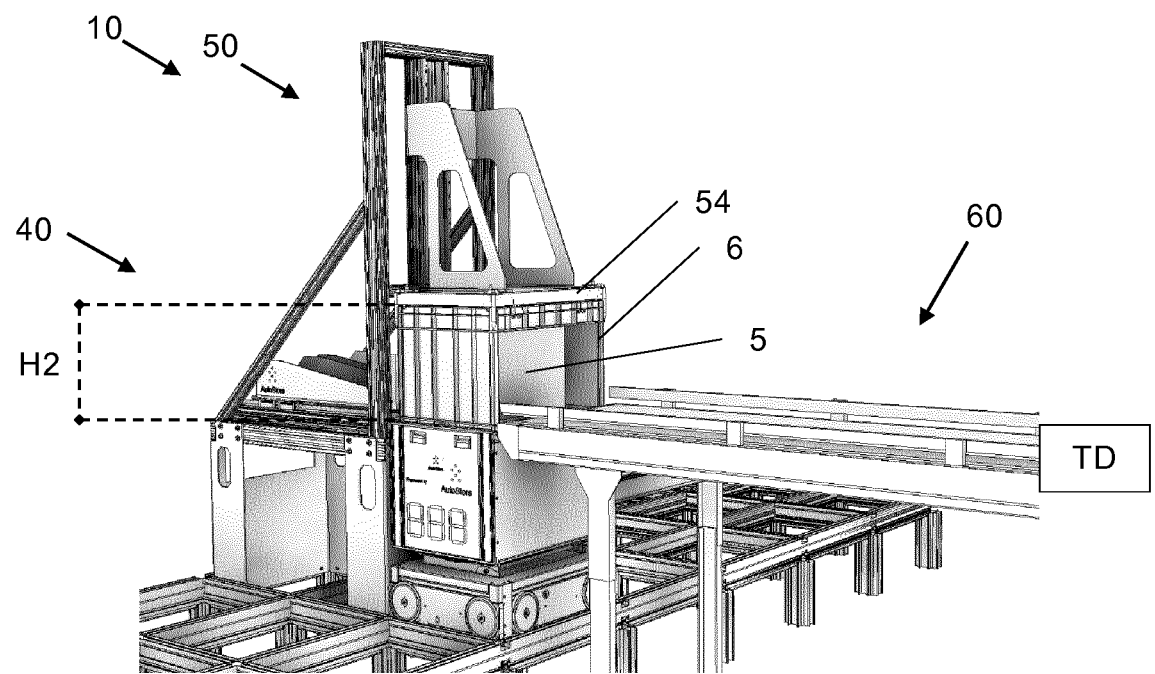

In FIG. 8e, the lifting frame 54 has been lowered and the connection interface CI is connected to the storage container 6.

In FIG. 8f, the lifting frame 54 has lifted the storage container upwardly a height H2, corresponding to FIG. 7c.

Figure 8G:
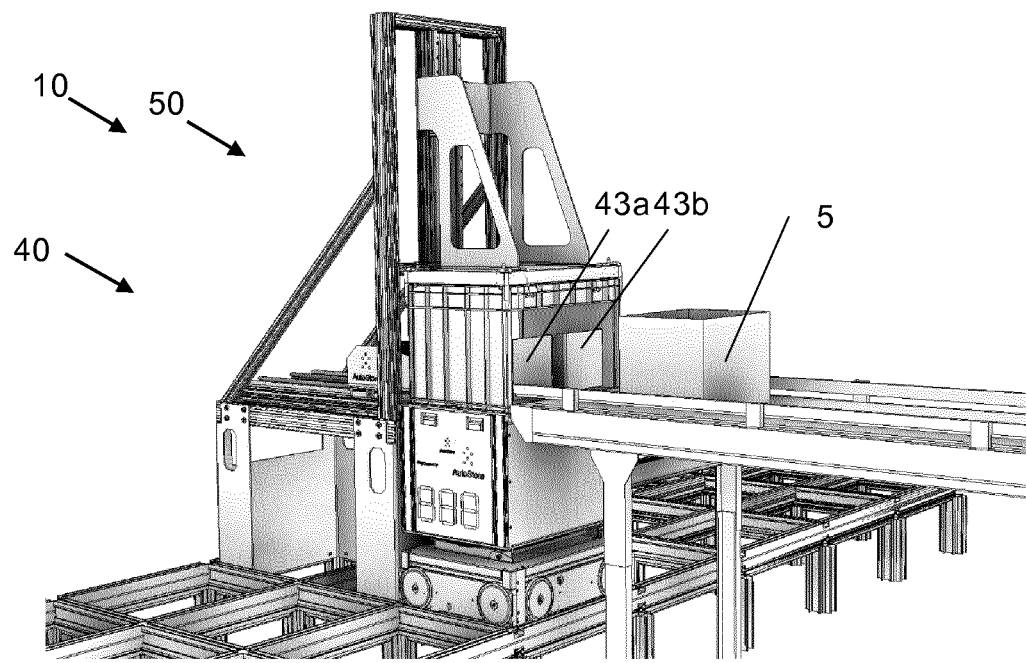

In FIG. 8g, the unloading members 42a, 42b have moved linearly in parallel into the side opening 6SO, thereby pushing the item 5 out from the storage container 6 and onto the belt conveyor 61.

In FIG. 8h, the unloading members 42a, 42b have returned to their initial position.

Later, lifting frame 54 will be lowered and the connection interface CI will be disconnected from the storage container 6. After elevating the lifting frame 54 without the storage container 6, the vehicle 30 may move away from the unloading station 10. As described above, the destination conveyor 60 will move the item 5 to its target destination TD.

Fourth Embodiment

It is now referred to FIGS. 9*a* and 9*b*. This embodiment corresponds to the first embodiment, i.e. the unloading station 10 does not comprise a container lifting device 50. However, the floor 6F is here provided at a height H1 below the lower edge 36SOE of the side opening 36SO of the container carrier 36, as in the second embodiment.

Here, the storage container 6 comprises an inclined member 6G provided between the floor 6F and the lower edge 36SOE, allowing the item 5 to be pushed by means of the unloading members 42*a*, 42*b* along the floor 6F and upwardly along the inclined member 6G and further out of the side opening 36SO, as shown in FIG. 9*b*.

The embodiments described in relation to the Figures solve at least some of the objectives, including that product items and shipping packages are handled with care—i.e. they are not damaged during the unloading of the container.

Fifth Embodiment

It is now referred to FIG. 10*a*. Here, the unloading device 40 does not comprise a container lifting device 50 or unloading members 42. Here, the unloading device 40 is provided as a tilting or pivoting device 48 mounted between the vehicle body 31 and the container carrier 36. In FIG. 10, it is shown that the container carrier 36 can be tilted with a tilting angle TA with respect to horizontal plane. The tilting angle TA can for example be up to 60°. This will cause the item 5 to slide out from the container 6 and the container carrier 36 and onto the belt conveyor 61.

In FIG. 10*b*, the container carrier 36 is similar to the one in FIG. 3, where the lower edge 36SOE of the side opening 36SO is aligned with the floor 6F of the storage container 6 when the storage container 6 is provided in the container carrier 36.

In FIG. 10*c*, the container carrier 36 is similar to the one in FIG. 9*b*, i.e. with an inclined member 6G provided between the floor 6F and the lower edge 36SOE.

It should be noted that in this and other embodiments above, the container floor 6F may be manufactured of or may be equipped with a material providing a desired friction with respect to the item 5, to enable that the item slides out from the container 6 and the container carrier 36 at the desired location only.

It should also be noted that the unloading device 40 may comprise a combination of the fifth embodiment and the first embodiment, i.e. having both a tilting or pivoting device 48 provided on the vehicle 30 and one or more reciprocating unloading members 42.

In the preceding description, it should be noted that the delivery vehicle may comprise a weighing mechanism in order to measure the weight of the storage container, for example a commercially available electronic weighing scale. Such a weighing mechanism may provide information concerning the content inside each storage container such as the total weight, the number of units, the internal weight distribution and/or the location within the storage grid the storage container should be placed It is now referred to FIG. 11. Here, the automated storage and retrieval system 1 comprises a delivery system 140 provided partially below the storage grid 104. The delivery system 140 may further comprise a delivery rail system 150 with rails 151, 152. The rail system 150 can be of the same type as the rail system of the storage grid 104.

Figure 11:
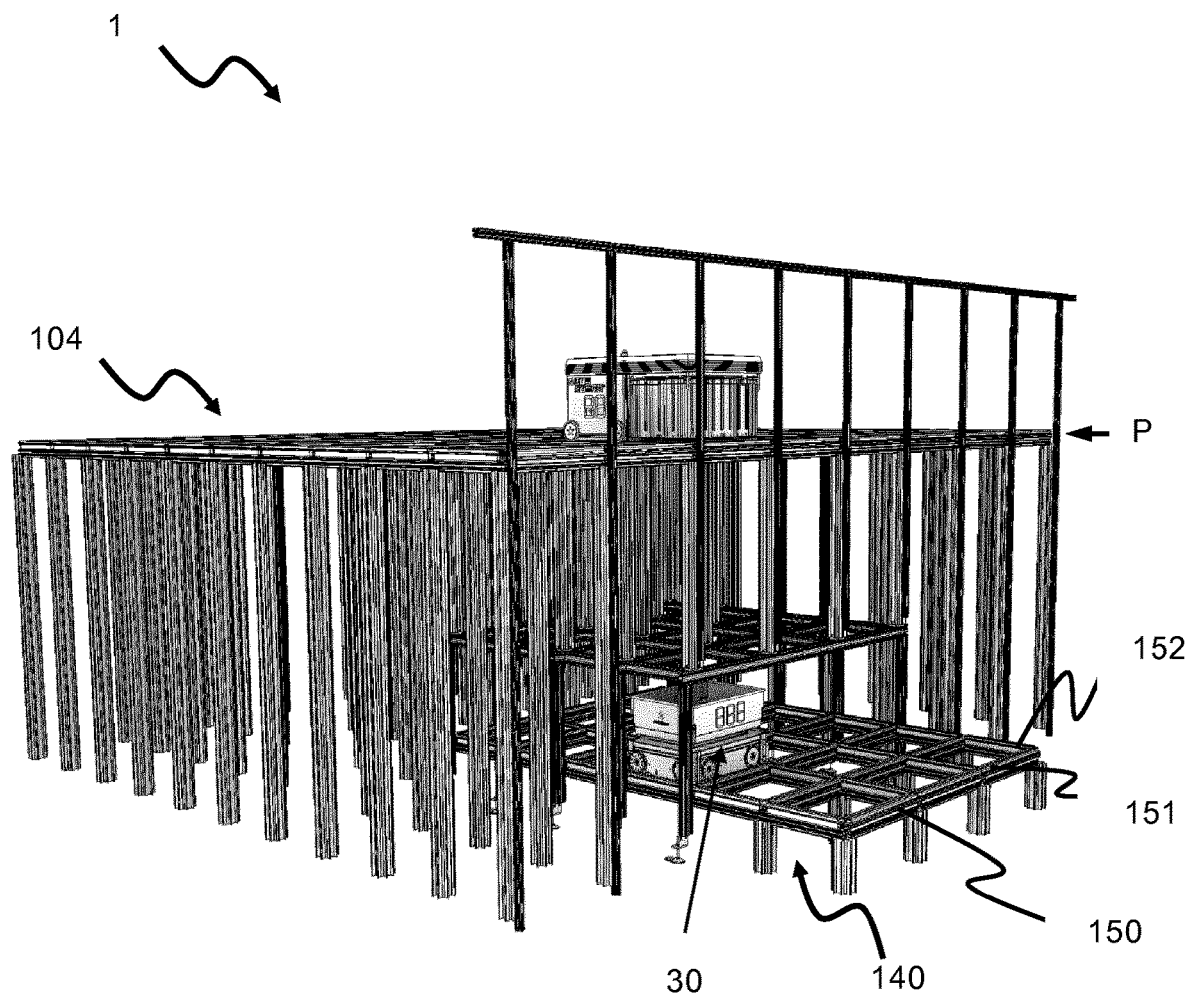
FIG. 11 shows a storage grid with a delivery system.

The delivery rail system 150 shown in FIG. 11 extends from a location inside the storage grid 104 to a location outside the storage grid 104, for example to a location where the above described unloading station 10 is located. The delivery vehicle 30 shown in FIG. 11 can be one of the above described delivery vehicles.

To get the most storage space for storage containers in the storage and retrieval grid, it may be advantageous to arrange the delivery rails system 150 such that it extends as little as possible into the storage grid 104. That means that the storage and retrieval grid may comprise a plurality of storage columns extending from the upper level to the base of the storage grid, thus allowing the greatest possible storage capacity since the entire storage column may be used for storage.

In order to maintain greatest possible storage capacity, the part of the delivery rail system 150 extending into the storage grid may be kept as small as possible. Thus, the delivery rail system 150 and the delivery vehicle 30 may occupy as little space as possible of the storage and retrieval grid, the space which may be used for storage of storage containers.

The delivery rail system 150 may comprise a first rail system located within the framework structure of the storage grid, and a second rail system located outside the framework structure of the storage grid, and wherein the first and second rail system are connected such that the delivery vehicle may operate between said rail systems.

The delivery system 140 may comprise an interface connectable to a third-party storage, production and distribution system. This interface may be the delivery rail system The delivery system may be integrable with a third-party storage, production and distribution system such that storage containers can be transported between the delivery system and the third-party storage, production and distribution system.

The delivery system of the present invention may be connectable to a third-party storage, production and distribution system such as production facility, a storage grid, assembling facility, reception or shipping location, etc. The connection may be by means of a connectable rail system or a conveyor system comprising conveyors employed to transport the storage containers between the delivery system and the third-party storage, production and distribution system.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention as defined by the appended claims.

REFERENCE NUMERALS

1 Automated storage and retrieval system
5 item
5*a* Product item
6 Storage container
6SO Side opening storage container 6F Floor of storage container
6S1 First parallel side walls storage container
6TO Top opening storage container
10 Unloading station
20 Control system storage and retrieval system
30 Delivery vehicle
31 Vehicle body
32 Wheel arrangement
36 Container carrier
36F Floor of container carrier
36SO Side opening container carrier
36S1 First parallel side walls container carrier
36S2 Second parallel side walls container carrier
36TO Top opening container carrier
36SOE Lower edge side opening container carrier
36UE Upper edge container carrier
40 Unloading device
41 Base structure unloading device
42a First unloading member
42b Second unloading member
43a First contact surface of first unloading member
43b Second contact surface of unloading member
44a First actuator
44b Second actuator
48 Tilting/pivoting device
50 Container lifting device
51 First frame structure
52 Second frame structure
53 Lifting mechanism
54 Container lifting frame
60 Destination conveyor
61 Belt conveyor
100 Framework structure
102 Upright members of framework structure
103 Horizontal members of framework structure
104 Storage grid/three-dimensional grid
105 Storage column
106 Storage container
107 Stack
108 Rail system/Container handling vehicle rail system
110 First set of parallel rails in first direction (X)
110a First neighboring rail of first set
110b Second neighboring rail of first set
111 Second set of parallel rails in second direction (Y)
111a First neighboring rail of second set
111b Second neighboring rail of second set
115 Grid opening/Container handling vehicle grid opening
119 Delivery column
120 Delivery column
122 Grid cell/Container handling vehicle grid cell
140 Delivery system
200 First container handling vehicle
201 Wheel arrangement
202,202' Container handling vehicle footprint
300 Second container handling vehicle
301 Wheel arrangement
X First direction
Y Second direction
Wo Width of container handling vehicle grid opening
Wc Width of container handling vehicle grid cell
Lo Length of container handling vehicle grid opening
Lc Length of container handling vehicle grid cell
Wod Width of delivery vehicle grid opening
Wcd Width of delivery vehicle grid cell
Lod Length of delivery vehicle grid opening
Lcd Length of delivery vehicle grid cell
H1 Height
H2 height
TD Target destination
CI Connection interface

The invention claimed is:

1. An automatic storage and retrieval system comprising:
a framework structure defining a storage grid comprising storage columns arranged in rows, in which storage columns storage containers are stacked one on top of another to form stacks;
a rail system arranged in a grid pattern across the top of the storage grid;
a plurality of container handling vehicles operated to raise storage containers from, and lower storage containers into, the storage columns, and to transport the storage containers above the storage columns;
an unloading arrangement;
wherein the automatic storage and retrieval system further comprises:
a delivery vehicle;
a storage container carried by the delivery vehicle, the storage container comprising a floor a top opening, two first parallel side walls; and two side openings, one in each of the first parallel side walls;
an unloading station for unloading an item (5; 5a) from the storage container while it is being carried by the delivery vehicle;
where the unloading station comprises:
an unloading device; and
a destination conveyor configured to convey the item to a target destination;
wherein the unloading device is configured to move the item (5; 5a) through the side opening of the storage container to the destination conveyor;
wherein the unloading device comprises:
a base structure fixed to the storage grid;
one or more unloading members, wherein each of the one or more unloading members has a contact surface; and
one or more actuators configured to move the one or more unloading members.

2. An automatic storage and retrieval system according to claim 1, wherein the delivery vehicle comprises a container carrier, the container carrier comprising:
a carrier floor;
a carrier top opening;
two first carrier parallel side walls;
two second carrier parallel side walls;
two carrier side openings, one in each of the first carrier parallel side walls, each of the carrier side openings comprising a lower edge and an upper edge.

3. The automatic storage and retrieval system according to claim 1 or 2, wherein the one or more unloading members comprises:
a first unloading member having a first contact surface adapted to the item; and
a second unloading member having a second contact surface adapted to the item.

4. An automatic storage and retrieval system according to claim 3, wherein the one or more actuators comprises:
a first actuator configured to move the first unloading member; and
a second actuator configured to move the second unloading member.

5. The automatic storage and retrieval system according to claim 3, wherein the actuators are configured to move the unloading members independently.

6. The automatic storage and retrieval system according to claim 1, wherein the unloading device further comprises a container lifting device comprising:
- a first frame structure;
- a container lifting frame having a connection interface configured to connect to the container; and
- a lifting mechanism configured to lift the container lifting frame relative to the first frame structure.

7. The automatic storage and retrieval system according to claim 6, wherein the container lifting device further comprises a second frame structure, wherein the container lifting frame is fixed below the second frame structure, and wherein the lifting mechanism is configured to move the second frame structure up and down relative to the first frame structure.

8. The automatic storage and retrieval system according to claim 6, wherein the container lifting device is configured to lift the container to a height where the floor of the storage container is horizontally aligned with the lower edge of the side opening.

9. The automatic storage and retrieval system according to claim 1, where the lower edge of the carrier side openings is aligned with a floor of the storage container during movement of the item (5, 5a) by means of the unloading device.

10. A method of unloading an item from a storage container in an automatic storage and retrieval system comprising:
- a framework structure defining a storage grid comprising storage columns arranged in rows, in which storage columns storage containers are stacked one on top of another to form stacks;
- a rail system arranged in a grid pattern across the top of the storage grid;
- a plurality of container handling vehicles operated to raise storage containers from, and lower storage containers into, the storage columns, and to transport the storage containers above the storage columns;

the method comprising:
- carrying the storage container to an unloading station comprising an unloading device with a base structure fixed to the storage grid, the container being carried by a delivery vehicle;
- moving the item through a side opening of the storage container to a destination conveyor of the unloading station by actuating one or more unloading members of the unloading device, wherein each of the one or more unloading members has a contact surface;
- conveying the item to a target destination by means of the destination conveyor.

11. The method of claim 10, wherein the storage container comprises:
- a floor;
- a top opening;
- two first parallel side walls; and
- two side openings, one in each of the first parallel side walls.

12. The method of claim 10 or 11, wherein the unloading device comprises:
- a base structure;
- one or more unloading members, wherein each of the one or more unloading members has a contact surface; and
- one or more actuators configured to move the one or more unloading members.

* * * * *